(12) United States Patent
Kim et al.

(10) Patent No.: US 12,041,493 B2
(45) Date of Patent: Jul. 16, 2024

(54) SUPPORT OF INTER-GNB HANDOVER IN HIGHER LAYER MULTI-CONNECTIVITY

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 601 days.

(21) Appl. No.: 17/278,949

(22) PCT Filed: Nov. 8, 2019

(86) PCT No.: PCT/KR2019/015117
§ 371 (c)(1),
(2) Date: Mar. 23, 2021

(87) PCT Pub. No.: WO2020/096396
PCT Pub. Date: May 14, 2020

(65) Prior Publication Data
US 2022/0053390 A1     Feb. 17, 2022

(30) Foreign Application Priority Data

Nov. 9, 2018  (KR) .................. 10-2018-0137587
Apr. 5, 2019  (KR) .................. 10-2019-0040411

(51) Int. Cl.
*H04W 36/00*   (2009.01)
*H04L 5/00*    (2006.01)
*H04W 36/08*   (2009.01)

(52) U.S. Cl.
CPC ....... *H04W 36/0069* (2018.08); *H04L 5/0053* (2013.01); *H04W 36/0061* (2013.01); *H04W 36/08* (2013.01)

(58) Field of Classification Search
CPC ............ H04W 36/0069; H04W 36/08; H04W 36/0061; H04L 5/0053
See application file for complete search history.

(56) References Cited

U.S. PATENT DOCUMENTS 8,817,745 B2 * 8/2014 Hu .................. H04W 40/36
                                              370/331
8,948,128 B2 * 2/2015 Jung ................ H04W 36/0066
                                              370/331

(Continued)

FOREIGN PATENT DOCUMENTS

CN    109246780 A * 1/2019 ............ H04W 36/00
WO    2016119210      8/2016

OTHER PUBLICATIONS

Huawei et al., CR on 37.340 for supporting the handover from NR to EN-DC, R2-1817363, 3GPP TSG-RAN WG2 Meeting #104, Spokane, US, Nov. 2, 2018, pp. 1-3, and figure 10.9.2-1.

(Continued)

*Primary Examiner* — Parth Patel
(74) *Attorney, Agent, or Firm* — BRYAN CAVE LEIGHTON PAISNER LLP

(57) ABSTRACT

A method and apparatus for supporting of inter-gNB handover in higher layer multi-connectivity is provided. A target master node (MN) of an inter-MN handover procedure receives a handover request message including information on a redundancy sequence number (RSN) from a source MN of the inter-MN handover procedure. The information on the RSN informs that a protocol data unit (PDU) session mapped to the RSN is allocated to a secondary node (SN) of the inter-MN handover procedure for redundant transmission.

5 Claims, 22 Drawing Sheets

(56) References Cited

U.S. PATENT DOCUMENTS

| | | | |
|---|---|---|---|
| 10,123,242 B2* | 11/2018 | Chiba | H04W 76/15 |
| 11,363,623 B2* | 6/2022 | Lee | H04L 1/1887 |
| 11,477,833 B2* | 10/2022 | Miklós | H04W 76/25 |
| 2003/0144018 A1* | 7/2003 | Minnick | H04W 36/22 |
| | | | 455/518 |
| 2018/0014231 A1 | 1/2018 | Chiba et al. | |
| 2018/0049224 A1* | 2/2018 | Dinan | H04W 4/70 |
| 2019/0357093 A1* | 11/2019 | Xu | H04W 36/0058 |
| 2020/0059989 A1* | 2/2020 | Velev | H04W 76/32 |
| 2020/0107213 A1* | 4/2020 | Park | H04W 4/24 |
| 2020/0154331 A1* | 5/2020 | Yang | H04W 36/00 |
| 2020/0260325 A1* | 8/2020 | Futaki | H04W 76/15 |
| 2021/0014754 A1* | 1/2021 | Ke | H04W 36/0038 |
| 2021/0092661 A1* | 3/2021 | Hu | H04W 28/02 |
| 2021/0211960 A1* | 7/2021 | Ryu | H04W 36/0011 |
| 2021/0219191 A1* | 7/2021 | Hu | H04W 36/0033 |
| 2021/0250788 A1* | 8/2021 | Kim | H04W 24/04 |
| 2021/0306879 A1* | 9/2021 | Bergström | H04W 28/0268 |
| 2021/0306946 A1* | 9/2021 | Miklós | H04W 76/15 |
| 2021/0392704 A1* | 12/2021 | Xu | H04L 1/1896 |
| 2022/0053390 A1* | 2/2022 | Kim | H04W 36/00 |
| 2022/0086725 A1* | 3/2022 | Zhang | H04W 36/18 |
| 2022/0150787 A1* | 5/2022 | Hathiramani | H04W 36/30 |
| 2023/0199592 A1* | 6/2023 | Yang | H04W 76/12 |
| | | | 370/331 |

OTHER PUBLICATIONS

OPPO, Discussion on Solutions for KI#1, S2-1810577, 3GPP TSG-SA WG2 Meeting #129, Dongguan, P.R. China, Oct. 9, 2018, pp. 1-2.

Ericsson, Redundant user plane paths based on dual connectivity, S2-184862, 3GPP TSG-SA WG2 Mee6ting #127bis, Newport Beach, USA, May 22, 2018, pp. 1-4.

Section 4 of 3GPP TS 37.340 V15.3.0, Sep. 2018.

Section 10.7 of 3GPP TS 37.340 V15.3.0, Sep. 2018.

Section 5.1 of 3GPP TR 23.725 V1.0.0, Sep. 2018.

Section 6.1 of 3GPP TR 23.725 V1.0.0, Sep. 2018.

* cited by examiner

SUPPORT OF INTER-GNB HANDOVER IN HIGHER LAYER MULTI-CONNECTIVITY

This application is the National Stage filing under 35 U.S.C. 371 of International Application No. PCT/KR2019/015117, filed on Nov. 8, 2019, which claims the benefit of Korean Patent Applications No. 10-2018-0137587 filed on Nov. 9, 2018 and No. 10-2019-0040411 filed on Apr. 5, 2019, the contents of which are all hereby incorporated by reference herein in their entirety.

TECHNICAL FIELD

The present disclosure relates to support of inter-gNB handover in higher layer multi-connectivity.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Enhancement of URLLC is being discussed for industrial internet of things (IoT).

SUMMARY

Higher layer multi-connectivity is being discussed for potential solution of enhancement of URLLC.

The present disclosure discusses support of the inter-gNB handover considering two redundant protocol data unit (PDU) sessions in higher layer multi-connectivity. The present disclosure discusses 5G RAN architecture and interface with introducing the inter-gNB handover considering two redundant PDU sessions in higher layer multi-connectivity, which includes the enhanced PDU session establishment procedure for dual connectivity in URLLC.

In an aspect, a method for a target master node (MN) of an inter-MN handover procedure in a wireless communication system is provided. The method includes receiving a handover request message including information on a redundancy sequence number (RSN) from a source MN of the inter-MN handover procedure. The information on the RSN informs that a protocol data unit (PDU) session mapped to the RSN is allocated to a secondary node (SN) of the inter-MN handover procedure.

In another aspect, an apparatus for implementing the above method is provided.

The present disclosure can have various advantageous effects.

For example, the target MN and (target) SN can continuously allocate the PDU session to each RSN as requested by CN.

For example, redundant transmission for higher layer multi-connectivity can be performed efficiently after inter-MN handover with/without MN initiated SN change procedure.

For example, for failure about the dual connectivity, the SMF can efficiently decide whether to continue with the PDU session not admitted at the (target) SN or release the PDU session.

For example, target MN and SN can remap the RSN to different PDU session ID according to its resource status.

For example, the UE's experience can be enhanced since the reliability for the data transmission can be improved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
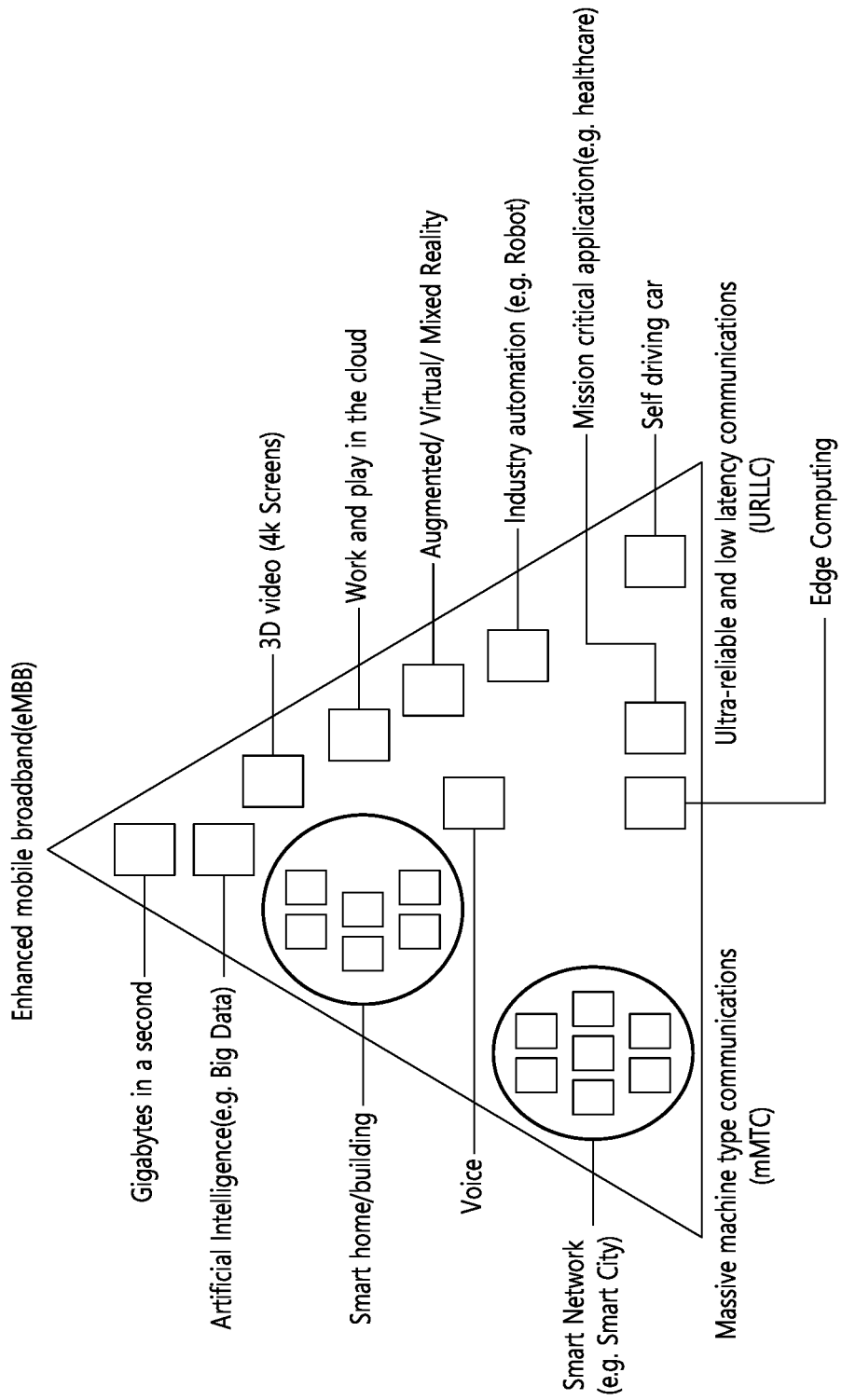
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the present disclosure, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
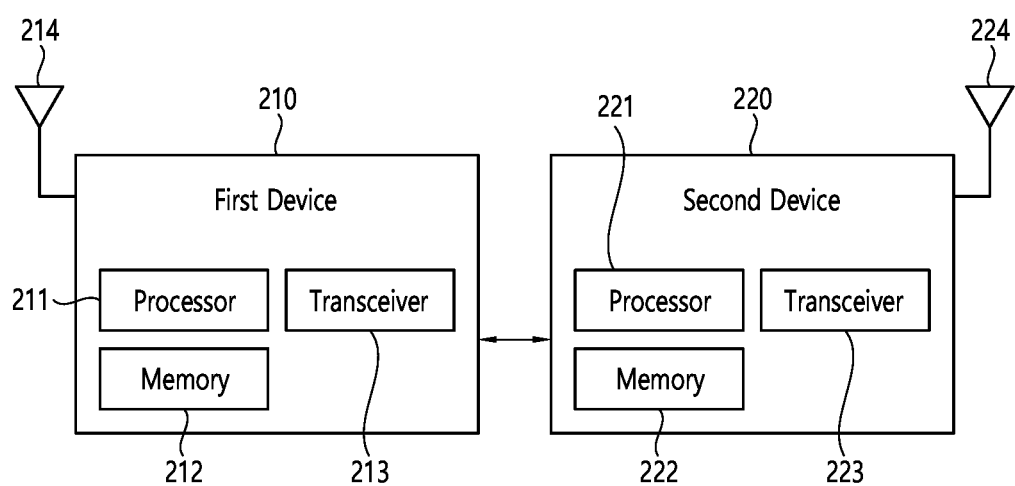
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
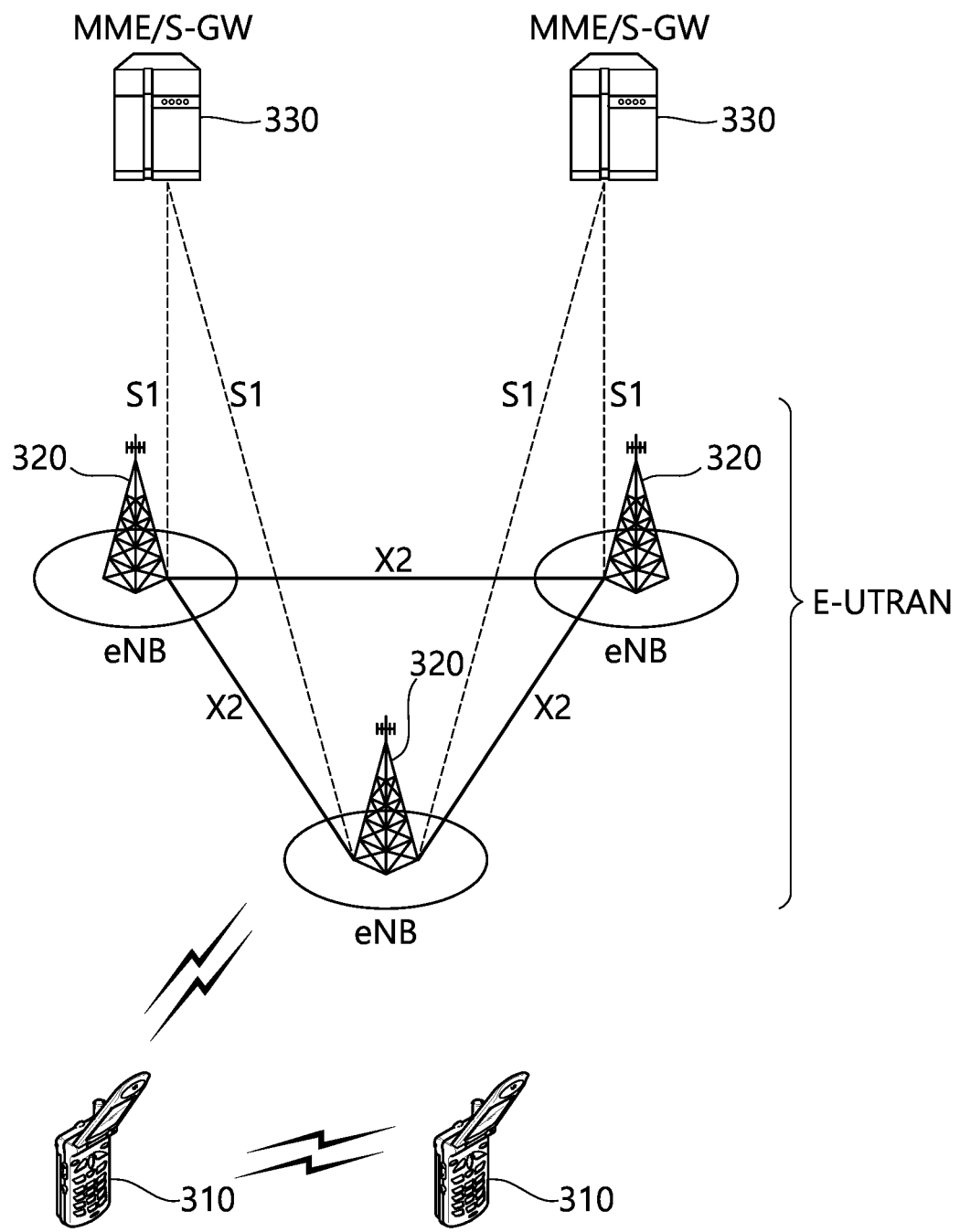
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
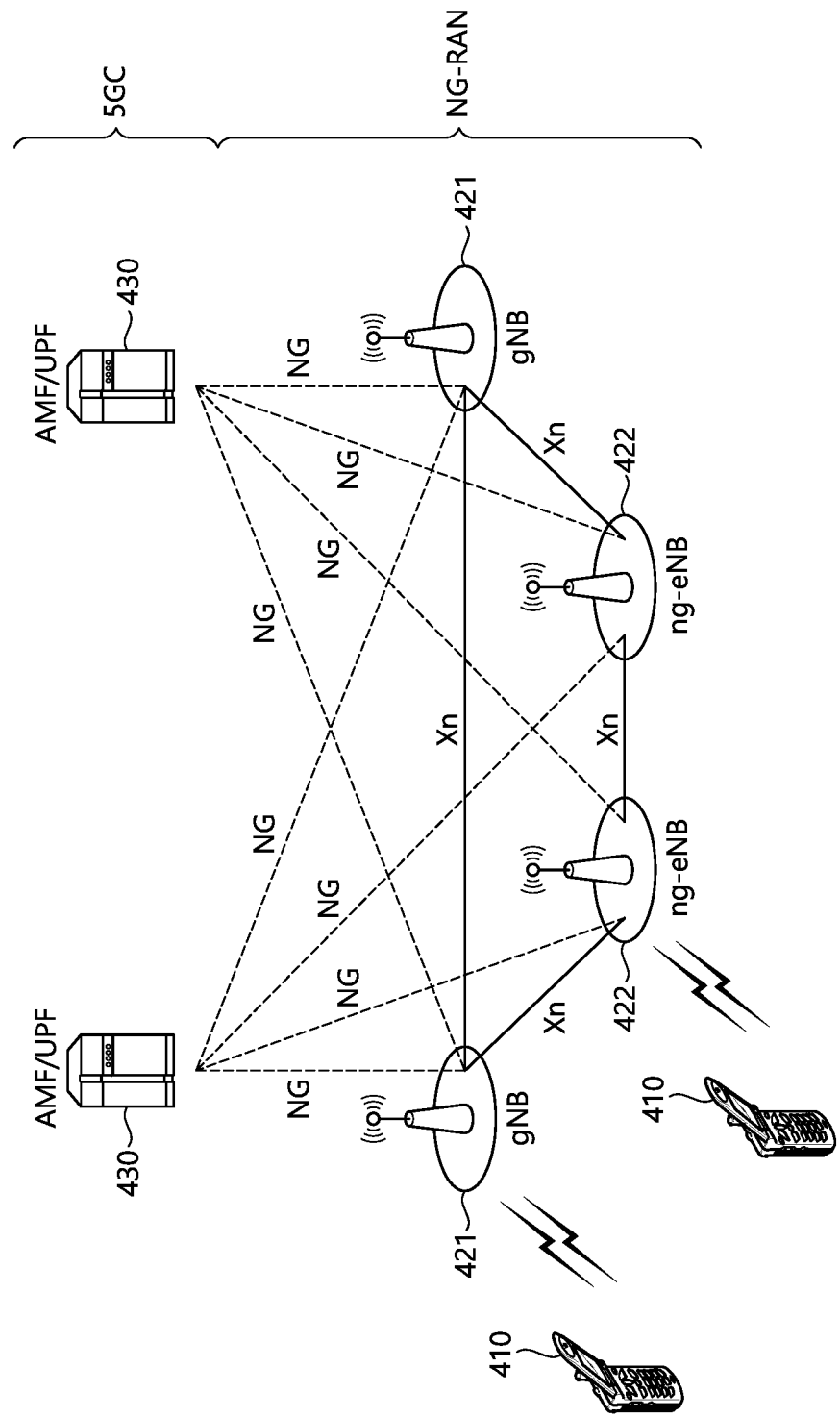
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

Figure 5:
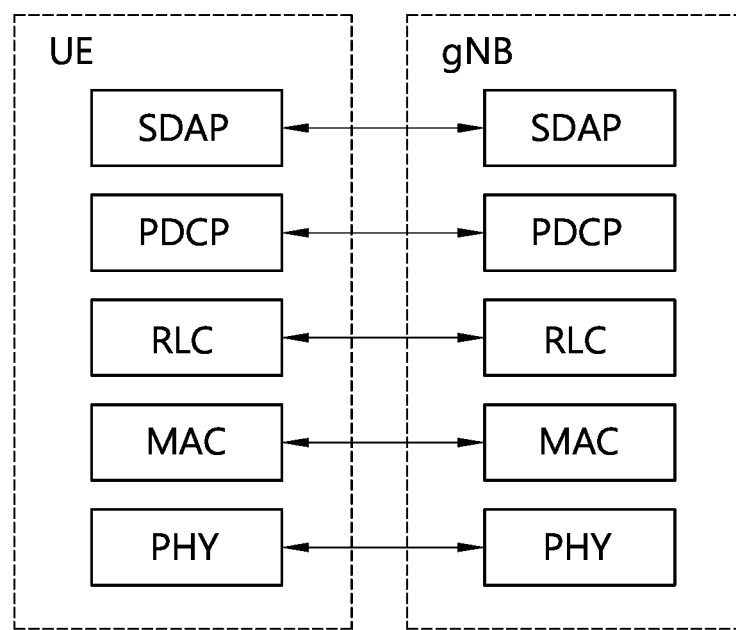
FIG. 5 shows a block diagram of a user plane protocol stack to which the technical features of the present disclosure can be applied.
Figure 6:
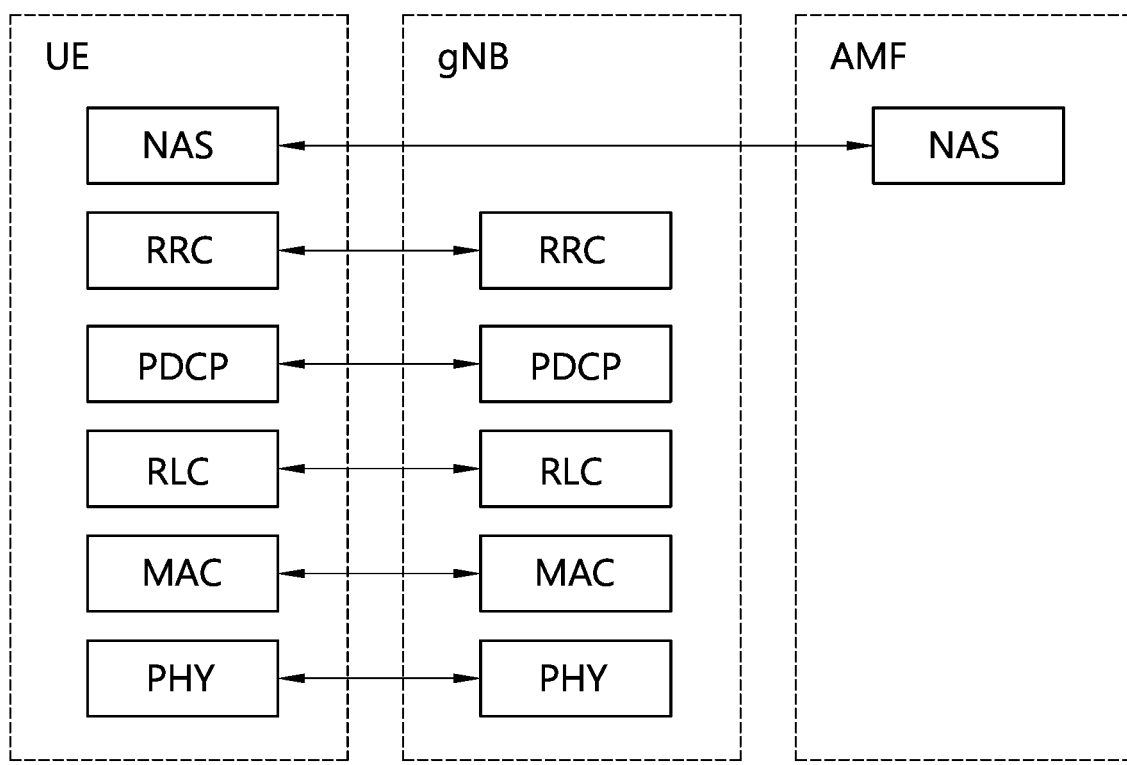
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Multi radio access technology (RAT) dual connectivity is described. Section 4 of 3GPP TS 37.340 V15.3.0 (2018 September) can be referred.

Multi-RAT dual connectivity (MR-DC) is a generalization of the intra-E-UTRA dual connectivity (DC), where a multiple reception (Rx)/transmission (Tx) UE may be configured to utilize resources provided by two different nodes connected via non-ideal backhaul, one providing E-UTRA access and the other one providing NR access. One node acts as the master node (MN) and the other as the secondary node (SN). The MN and SN are connected via a network interface and at least the MN is connected to the core network.

MR-DC is designed based on the assumption of non-ideal backhaul between the different nodes but can also be used in case of ideal backhaul.

E-UTRAN supports MR-DC via E-UTRA-NR dual connectivity (EN-DC), in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface. EN-DC may be referred to as "Option 3" of MR-DC.

NG-RAN supports NG-RAN E-UTRA-NR dual connectivity (NGEN-DC), in which a UE is connected to one ng-eNB that acts as a MN and one gNB that acts as a SN. The ng-eNB is connected to the 5GC and the gNB is connected to the ng-eNB via the Xn interface. NGEN-DC may be referred to as "Option 7" of MR-DC.

NG-RAN supports NR-E-UTRA dual connectivity (NE-DC), in which a UE is connected to one gNB that acts as a MN and one ng-eNB that acts as a SN. The gNB is connected to 5GC and the ng-eNB is connected to the gNB via the Xn interface. NE-DC may be referred to as "Option 4" of MR-DC.

For control plane radio protocol architecture, in MR-DC, the UE has a single RRC state, based on the MN RRC and a single C-plane connection towards the core network. Each radio node has its own RRC entity (E-UTRA version if the node is an eNB or NR version if the node is a gNB) which can generate RRC PDUs to be sent to the UE.

RRC PDUs generated by the SN can be transported via the MN to the UE. The MN always sends the initial SN RRC configuration via master cell group (MCG) SRB (SRB1), but subsequent reconfigurations may be transported via MN or SN. When transporting RRC PDU from the SN, the MN does not modify the UE configuration provided by the SN.

In EN-DC, at initial connection establishment, SRB1 uses E-UTRA PDCP. After initial connection establishment, MCG SRBs (SRB1 and SRB2) can be configured by the network to use either E-UTRA PDCP or NR PDCP. A PDCP version change (release of old PDCP and establish of new PDCP) of SRBs can be supported in either direction (i.e., from E-UTRA PDCP to NR PDCP or vice versa) via a handover procedure (reconfiguration with mobility) or, for the initial change from E-UTRA PDCP to NR PDCP, with a reconfiguration without mobility, when the network knows there is no UL data in buffer and before the initial security activation. For EN-DC capable UEs, NR PDCP can be configured for DRBs and SRBs also before EN-DC is configured.

If the SN is a gNB (i.e., for EN-DC and NGEN-DC), the UE can be configured to establish a SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB is supported for all MR-DC options, allowing duplication of RRC PDUs generated by the MN, via the direct path and via the SN. Split SRB uses NR PDCP.

In EN-DC, the secondary cell group (SCG) configuration is kept in the UE during suspension. The UE releases the SCG configuration (but not the radio bearer configuration) during resumption initiation.

For user plane radio protocol architecture, in MR-DC, from a UE perspective, three bearer types exist: MCG bearer, SCG bearer and split bearer.

For EN-DC, the network can configure either E-UTRA PDCP or NR PDCP for MN terminated MCG bearers while NR PDCP is always used for all other bearers.

In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN.

From a network perspective, each bearer (MCG, SCG and split bearer) can be terminated either in MN or in SN.

Even if only SCG bearers are configured for a UE, for SRB1 and SRB2 the logical channels are always configured at least in the MCG, i.e., this is still an MR-DC configuration and a primary cell (PCell) always exists.

If only MCG bearers are configured for a UE, i.e., there is no SCG, this is still considered an MR-DC configuration, as long as at least one of the bearers is terminated in the SN.

For control plane network interfaces, in MR-DC, there is an interface between the MN and the SN for control plane signaling and coordination. For each MR-DC UE, there is also one control plane connection between the MN and a corresponding CN entity. The MN and the SN involved in MR-DC for a certain UE control their radio resources and are primarily responsible for allocating radio resources of their cells.

In MR-DC with EPC (EN-DC), the involved core network entity is the MME. S1-MME is terminated in MN and the MN and the SN are interconnected via X2-C.

In MR-DC with 5GC (NGEN-DC, NE-DC), the involved core network entity is the AMF. NG-C is terminated in the MN and the MN and the SN are interconnected via Xn-C.

For user plane network interfaces, there are different U-plane connectivity options of the MN and SN involved in MR-DC for a certain UE. The U-plane connectivity depends on the bearer option configured:

(1) For MN terminated bearers, the user plane connection to the CN entity is terminated in the MN;

(2) For SN terminated bearers, the user plane connection to the CN entity is terminated in the SN;

(3) The transport of user plane data over the Uu either involves MCG or SCG radio resources or both:

For MCG bearers, only MCG radio resources are involved;

For SCG bearers, only SCG radio resources are involved;

For split bearers, both MCG and SCG radio resources are involved.

(4) For split bearers, MN terminated SCG bearers and SN terminated MCG bearers, PDCP data is transferred between the MN and the SN via the MN-SN user plane interface.

For MR-DC with EPC (EN-DC), X2-U interface is the user plane interface between MN and SN, and S1-U is the user plane interface between the MN, the SN or both and the S-GW.

For MR-DC with 5GC (NGEN-DC, NE-DC), Xn-U interface is the user plane interface between MN and SN, and NG-U is the user plane interface between the MN, the SN or both and the UPF.

Inter-master node handover with/without secondary node change is described. Section 10.7 of 3GPP TS 37.340 V15.3.0 (2018 September) can be referred.

Inter-MN handover with/without MN initiated SN change is used to transfer UE context data from a source MN to a target MN while the UE context at the SN is kept (i.e., without SN change) or moved to another SN (i.e., with SN change). During an inter-MN handover, the target MN decides whether to keep or change the SN (or release the SN).

Figure 7:
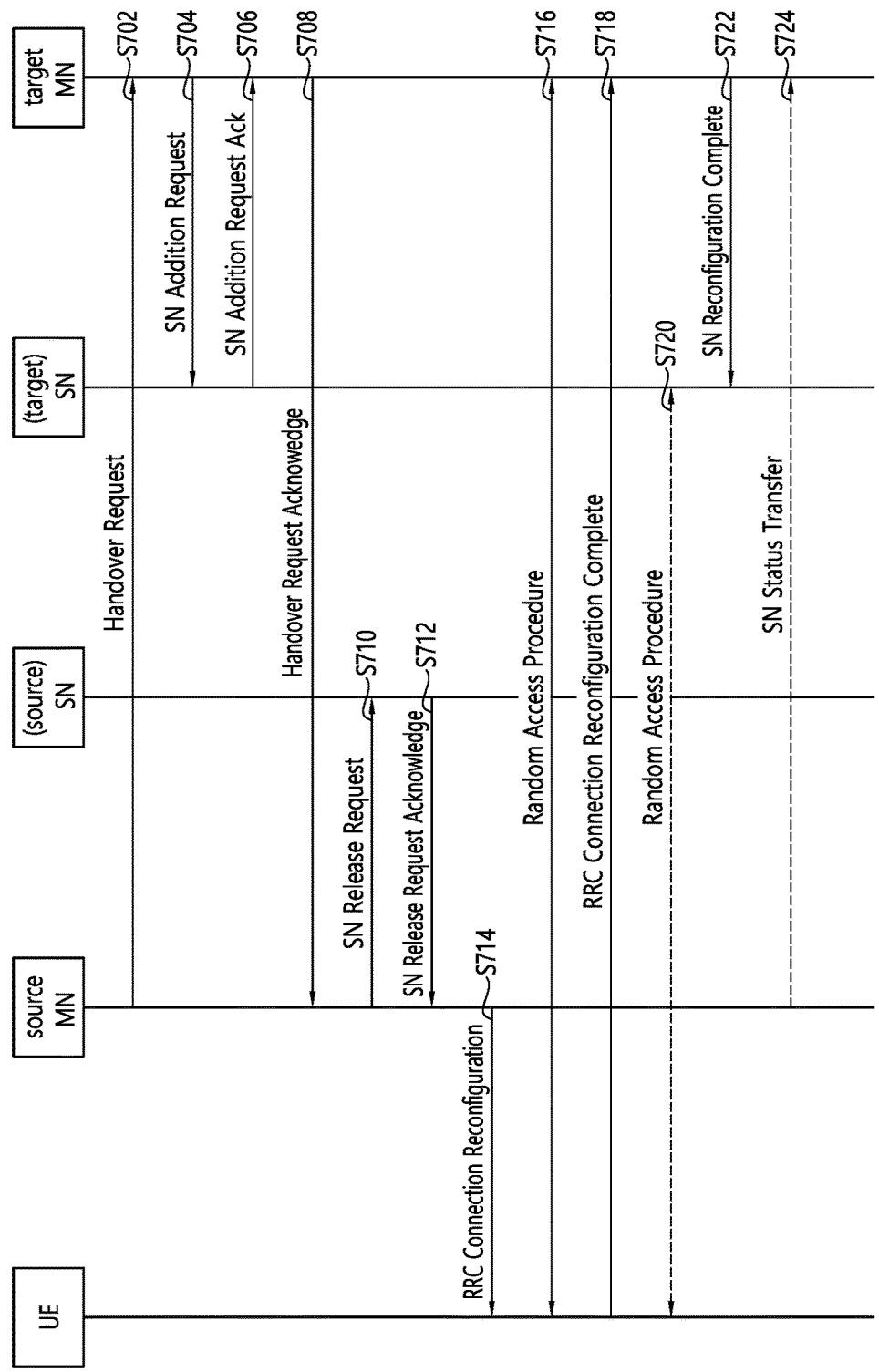
FIG. 7 and FIG. 8 show an example of an inter-MN handover with/without MN initiated SN change procedure to which the technical feature of the present disclosure.
Figure 8:
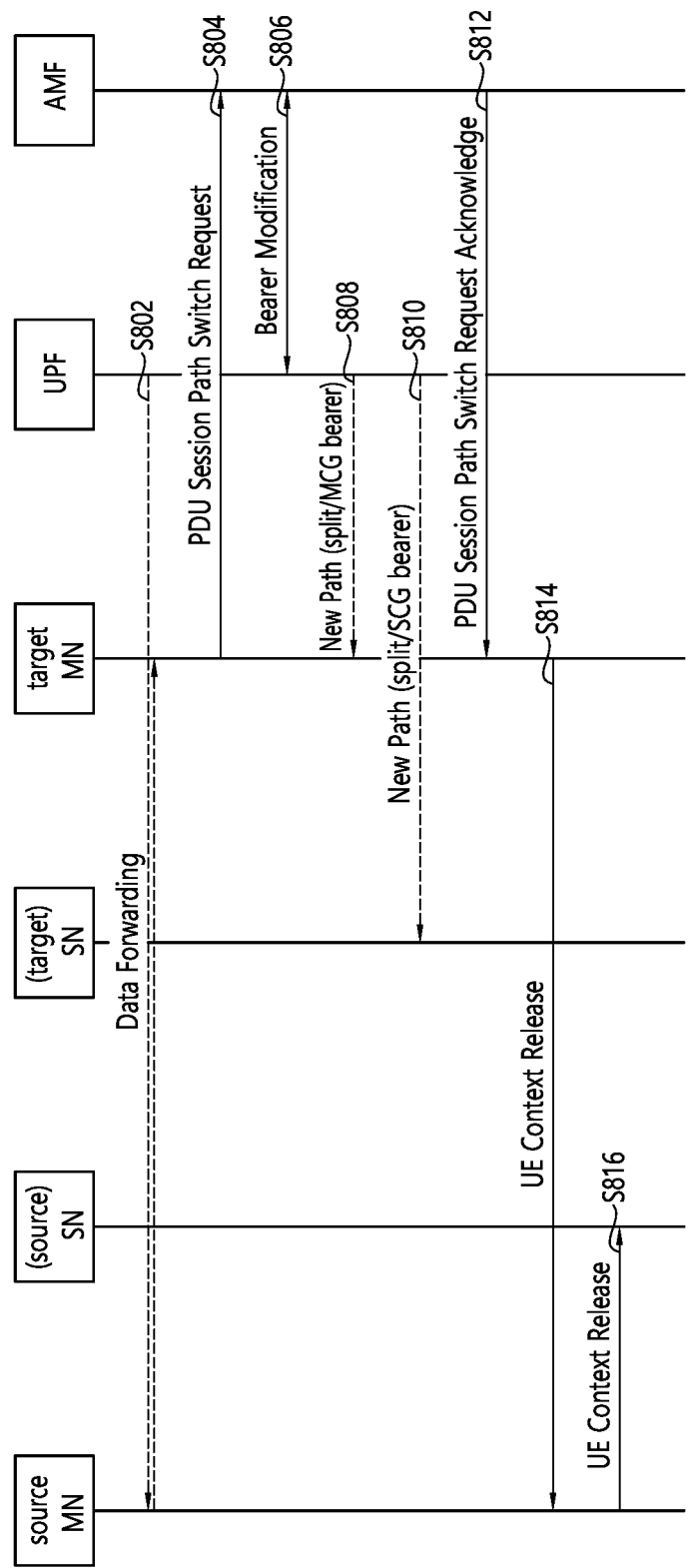

FIG. 7 and FIG. 8 show an example of an inter-MN handover with/without MN initiated SN change procedure to which the technical feature of the present disclosure.

For an inter-MN handover without SN change, the source SN and the target SN shown in FIG. 7 and FIG. 8 are the same node. The inter-MN handover with/without MN initiated SN change shown in FIG. 7 and FIG. 8 is exemplarily applied to MR-DC with 5GC (e.g., option 4/7 of MR-DC). But, inter-MN handover with/without MN initiated SN change shown in FIG. 7 and FIG. 8 may be applied to EN-DC (e.g., option 3 of MR-DC) without loss of generality.

First, FIG. 7 is described.

Step S702: The source MN starts the handover procedure by initiating the Xn Handover Preparation procedure including both MCG and SCG configuration. The source MN includes the source SN UE XnAP ID, SN ID and the UE context in the source SN in the Handover Request message. The source MN may send the SN Modification Request message to the (source) SN) to request the current SCG configuration before step S702.

Step S704: If the target MN decides to keep the source SN, the target MN sends SN Addition Request message to the SN including the SN UE XnAP ID as a reference to the UE context in the SN that was established by the source MN. If the target MN decides to change the SN, the target MN sends the SN Addition Request message to the target SN including the UE context in the source SN that was established by the source MN.

Step S706: The (target) SN replies with SN Addition Request Acknowledge message. The (target) SN may include the indication of the full or delta RRC configuration.

Step S708: The target MN includes within the Handover Request Acknowledge message a transparent container to be sent to the UE as an RRC message to perform the handover, and may also provide forwarding addresses to the source MN. The target MN indicates to the source MN that the UE context in the SN is kept if the target MN and the SN decided to keep the UE context in the SN in step S704 and step S706.

Step S710: The source MN sends SN Release Request message to the (source) SN including a cause indicating MCG mobility.

Step S712: The (source) SN acknowledges the release request. The source MN indicates to the (source) SN that the UE context in SN is kept, if it receives the indication from the target MN. If the indication as the UE context kept in SN is included, the SN keeps the UE context.

Step S714: The source MN triggers the UE to perform handover and apply the new configuration.

Step S716: The UE synchronizes to the target MN

Step S718: The UE replies with MN RRC reconfiguration complete message.

Step S720: If configured with bearers requiring SCG radio resources, the UE may synchronize to the (target) SN.

Step S722: If the RRC connection reconfiguration procedure was successful, the target MN informs the (target) SN via SN Reconfiguration Complete message.

Step S724: For bearers using RLC AM, the source MN sends the SN Status transfer to the target MN.

Next, FIG. 8, of which procedure follows the procedure shown in FIG. 7, is described.

Step S802: Data forwarding from the source MN takes place. If the SN is kept, data forwarding may be omitted for SCG bearers and SCG split bearers.

Step S804: The target MN initiates the PDU Session Path Switch procedure. The target MN transmits a PDU Session Path Switch Request message to the AMF.

Step S806: Bearer modification is performed between the UPF and AMF.

Step S808: New path for MCG bearer and/or split bearer is provided from the UPF to the target MN.

Step S810: New path for SCG bearer and/or split bearer is provided from the UPF to the (target) SN.

Step S812: The AMF transmits a PDU Session Path Switch Request Acknowledge message to the target MN.

If new UL tunnel endpoint IDs (TEIDs) of the UPF for SN are included, the target MN may perform MN initiated SN Modification procedure to provide them to the SN.

Step S814: The target MN initiates the UE Context Release procedure towards the source MN.

Step S816: Upon reception of the UE Context Release message from source MN, the (source) SN can release C-plane related resource associated to the UE context towards the source MN. Any ongoing data forwarding may continue. The SN shall not release the UE context associated with the target MN if the indication was included in the SN Release Request message in step S710 in FIG. 7.

Features related to higher layer multi-connectivity is described. Section 5.1 and Section 6.1 of 3GPP TR 23.725 V1.0.0 (2018 September) can be referred. To support URLLC, it is needed to consider the higher layer multi-connectivity.

One of key issues for enhancement of URLLC support in 5GC may be supporting high reliability by redundant transmission in user plane. In order to ensure the high reliability which can hardly be achieved by single path on user plane, redundant transmission in 5GS may be supported. Depending on the condition of network deployment, e.g., which network functions (NFs) or segments cannot meet the requirements of reliability, the redundant transmission may be applied on the user plane path between the UE and the network. The following aspects need to be studied for this key issue:

How to establish, modify or release multiple tunnels for redundant data transmission on N3 and N9.

How to support handover procedure for PDU session using redundant transmission.

How to ensure the multiple tunnels on N3, N6 and N9 for redundant transmission to be transferred over separate transport layer paths in case single transport layer path cannot support the reliability requirements.

How to make decision on enabling redundant transmission or not for a specific QoS flow.

How to replicate the data packets in UE/RAN/UPF, when needed.

How to eliminate the replicates received from different paths in UE/RAN/UPF, when needed.

Identify the impact to protocol stack of user plane to support redundant transmission.

Redundant user plane paths based on dual connectivity may be provided as one of solutions for the above described issue related to supporting high reliability by redundant transmission in user plane, This solution will enable a terminal device to set up two redundant PDU sessions over the 5G network, so that the network will attempt to make the paths of the two redundant PDU sessions independent whenever that is possible. It is possible to rely on upper layer protocols, such as the IEEE Time Sensitive Networking (TSN) Frame Replication and Elimination for Reliability (FRER), to manage the replication and elimination of redundant packets/frames over the duplicate paths which can span both the 3GPP segments and possibly fixed network segments as well. Other upper layer protocols, including IP based ones such as a deterministic networking (DetNet) based solution, can also be possible for redundant packet transmission over multiple paths or for managing a backup path in addition to the active path.

Figure 9:
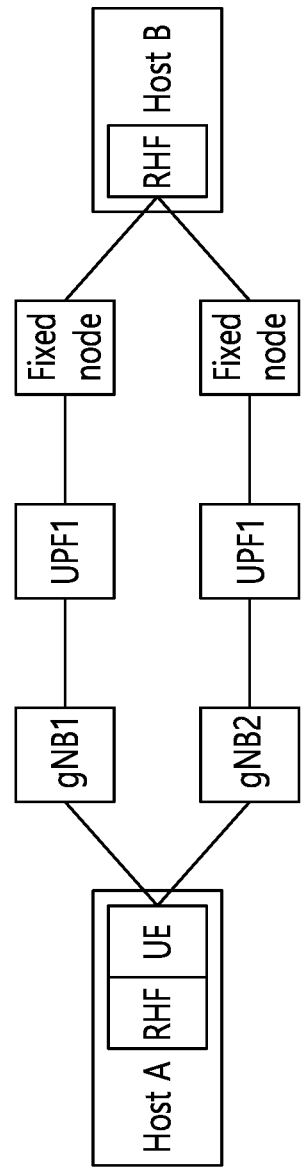
FIG. 9 shows an example of high level architecture for redundant user plane paths to which the technical features of the present disclosure can be applied.

FIG. 9 shows an example of high level architecture for redundant user plane paths to which the technical features of the present disclosure can be applied.

The 3GPP network provides two paths from the device: the first PDU session spans from the UE via gNB1 to UPF1 acting as the PDU session anchor, and the second PDU session spans from the UE via gNB2 to UPF2 acting as the PDU session anchor. Based on these two independent PDU sessions, two independent paths are set up, which may span even beyond the 3GPP network. Referring to FIG. 9, two paths are set up between Host A in the device and Host B, with some (optional) fixed intermediate nodes. The redundancy handling function (RHF) entities that reside in Host A and Host B make use of the independent paths. The IEEE TSN FRER mentioned above is an example for a RHF. For Host A within the device, the two PDU sessions appear as different networking interfaces, making the host multi-homed. In the network side, other solutions are also possible, where redundancy spans only up to an intermediate node and not to the endhost.

Figure 10:
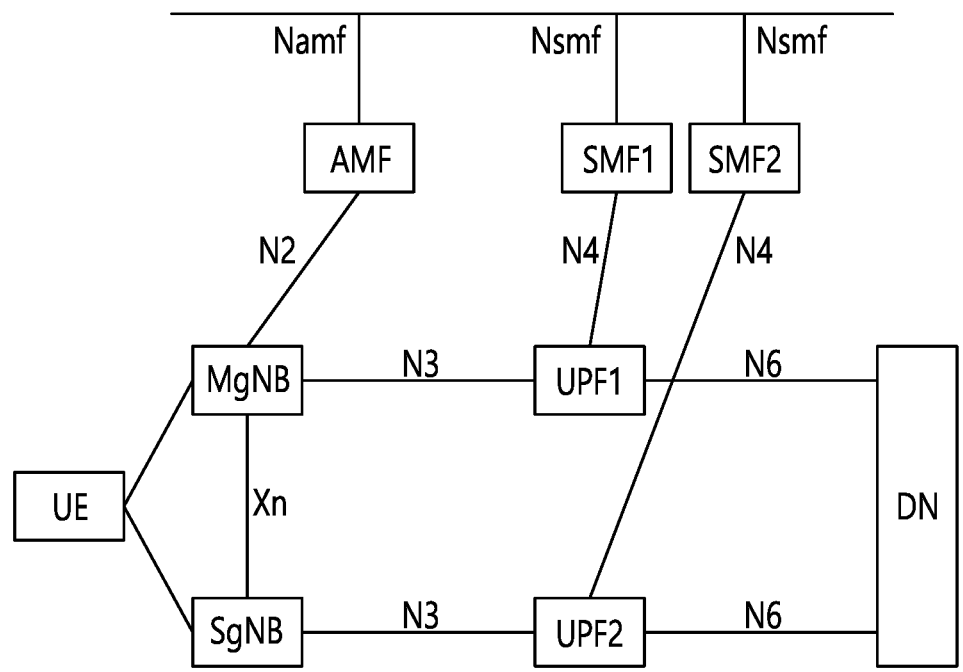
FIG. 10 shows an example of a solution architecture for redundant user plane paths to which the technical features of the present disclosure can be applied.

FIG. 10 shows an example of a solution architecture for redundant user plane paths to which the technical features of the present disclosure can be applied.

This solution is based on the dual connectivity feature that is supported both by LTE and NR. Referring to FIG. 10, a single UE has user plane connectivity with both a MgNB and a SgNB. The RAN control plane and N1 are handled via the MgNB. The MgNB controls the selection of SgNB and the setup of the dual connectivity feature via the Xn interface. The UE sets up two PDU sessions, one via MgNB to UPF1 acting as the PDU session anchor, and another one via SgNB to UPF2 acting as the PDU session anchor. UPF1 and UPF2 connect to the same data network (DN), even though the traffic via UPF1 and UPF2 might be routed via different user plane nodes within the DN. UPF1 and UPF2 are controlled by SMF1 and SMF2, respectively, where SMF1 and SMF2 may coincide depending on operator configuration of the SMF selection. Other 3GPP entities not relevant for this solution are not shown in FIG. 10.

This solution differs from the RAN based PDCP packet duplication function which is internal to RAN, and the packet duplication takes place between the UE and the MgNB. In this solution, the redundant paths span the whole system including RAN, CN, and can possibly extend to data network beyond 3GPP scope as well.

This solution has a number of assumptions to be applicable.

RAN supports dual connectivity, and RAN coverage is sufficient for dual connectivity in the target area.

UEs support dual connectivity.

The core network UPF deployment is aligned with RAN deployment and supports redundant user plane paths.

The underlying transport topology is aligned with the RAN and UPF deployment and supports redundant user plane paths.

The physical network topology and geographical distribution of functions also supports the redundant user plane paths to the extent deemed necessary by the operator.

The operation of the redundant user plane paths is made sufficiently independent, to the extent deemed necessary by the operator, e.g., independent power supplies.

This solution is illustrated in FIG. 10 showing two SMFs, though this solution is also applicable using single SMF. This solution does not affect SMF selection, and this solution can be applied no matter whether the same or different SMFs are chosen, even though the existing mechanisms based on the data network name (DNN) or single network slice selection assistance information (S-NSSAI) may be used to influence whether different SMFs are selected or whether the same SMF is selected. In case of two SMFs are used, the SMFs are aware the sessions are redundant (two distinct sessions). In case of multiple SMFs are used, the SMFs are configured to have different UPF pool in order to avoid reuse of same UPF by different SMFs.

SMF(s) are aware of redundant sessions based on a new indication, redundancy sequence number (RSN) provided by the UE in the PDU Session Establishment Request message. The presence of the RSN indicates redundant handling, and the value of the RSN indicates whether the first or the second PDU session is being established. As a fallback solution, when the RSN is not provided by the UE, the SMF may also use the DNN or the S-NSSAI in combination with operator configuration to determine whether the first or second PDU session is being established for redundancy. The SMF uses the knowledge about whether the first or second PDU session is being established in combination with proper provisioning during UPF selection.

Two options are provided for the selection of the UPFs and the gNBs. For a static approach, UPF selection takes place before the SgNB is selected in RAN. This is applicable to both IP based and Ethernet based PDU sessions. In addition, a dynamic approach for UPF selection enhances the static approach taking into account the SgNB selected in RAN. This is applicable to Ethernet PDU sessions. For the static approach, the followings may be considered.

The UPF selection is based on existing mechanisms, with the extension that it is known in the SMF, based on UE indication of the RSN or network configuration based on the DNN or S-NSSAI, whether the UE is establishing the first or second PDU session. This information may be used as an input to the UPF selection.

When the PDU sessions are established, it is explicitly requested that RAN handles the first PDU session at the MgNB and the second PDU session at the SgNB using dual connectivity.

Initially, the two PDU sessions use the same MgNB, but as soon as dual connectivity is set up in RAN, the second PDU session's user plane connection is moved to the SgNB, and the user plane tunneling is switched to go via the SgNB.

Figure 11:
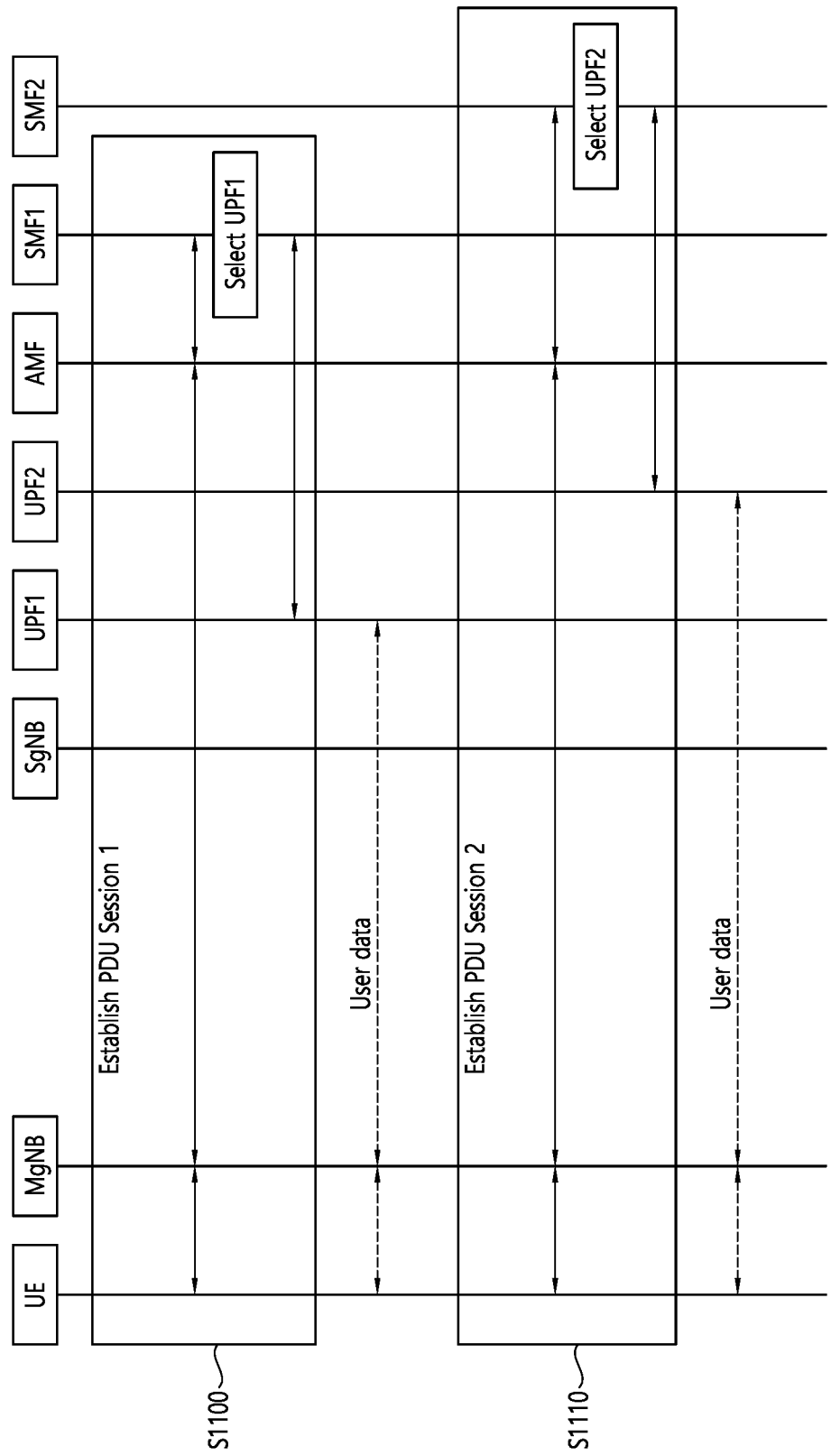
FIG. 11 and FIG. 12 show an example of a procedure based on static approach to which the technical features of the present disclosure can be applied.
Figure 12:
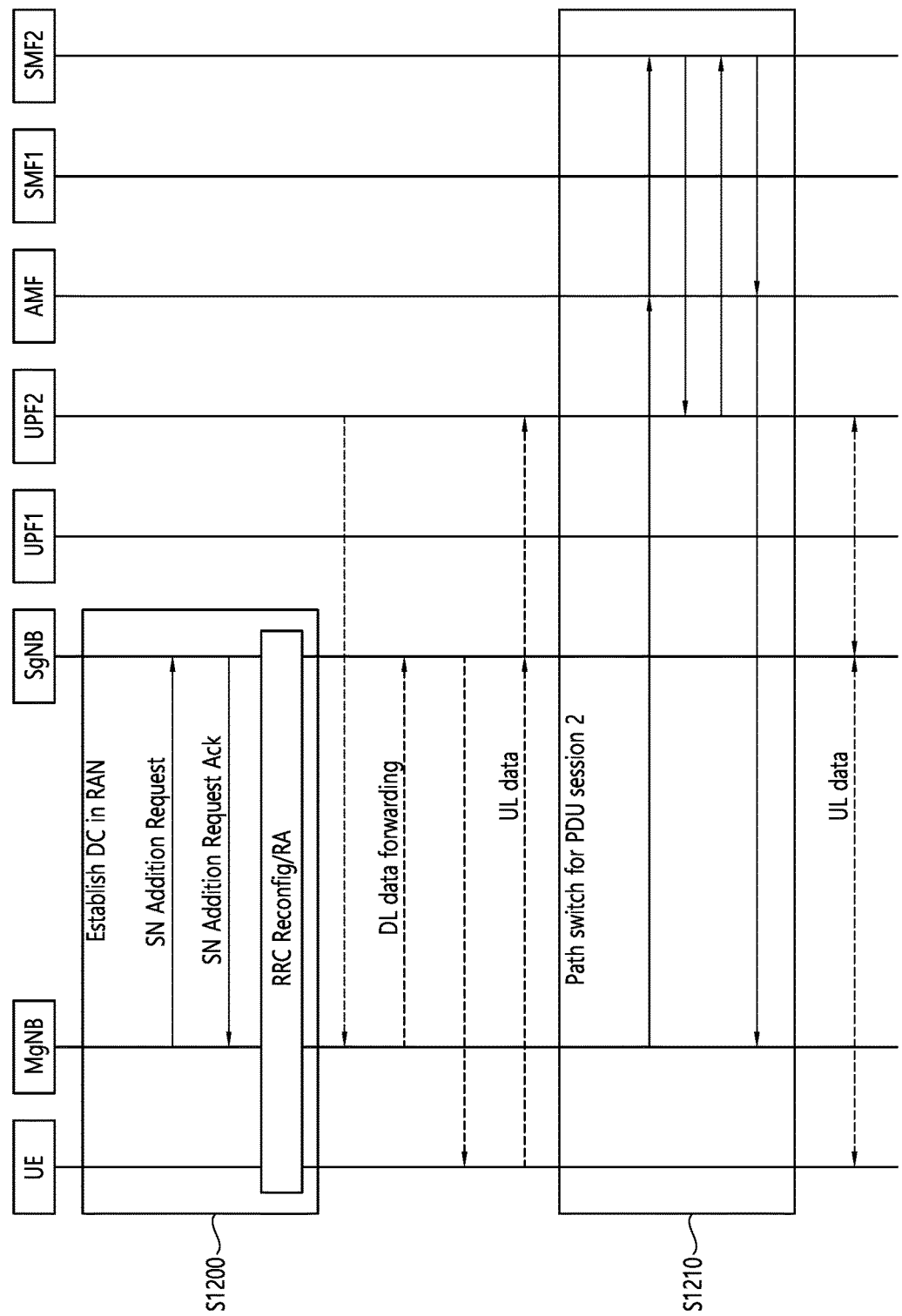

FIG. 11 and FIG. 12 show an example of a procedure based on static approach to which the technical features of the present disclosure can be applied.

The setup of the two PDU sessions and the subsequent establishment of dual connectivity takes place as follows in the static approach.

First, FIG. 11 is described. FIG. 11 shows an example of a setup procedure of two PDUs sessions.

Step S1100: PDU Session 1 is established. SMF1 determines based on the RSN provided by the UE, or based on the DNN or S-NSSAI and corresponding network configuration that the PDU session is to be handled redundantly and this is the first PDU session. SMF1 selects UPF1, where SMF1 may take into account in the selection that the current RAN node is MgNB and this is the first PDU session in the redundant handling. An indication is sent to RAN that this PDU session is the first in the redundant handling that is requesting dual connectivity.

Step S1110: Similarly, PDU session 2 is established. SMF2 determines based on the RSN provided by the UE, or based on the DNN or S-NSSAI and corresponding network configuration that the PDU Session is to be handled redundantly and this is the second PDU session. SMF2 selects UPF2, where SMF2 may take into account in the selection that the current RAN node is MgNB and this is the second PDU session in the redundant handling. An indication is sent to RAN that this PDU session is the second in the redundant handling that is requesting dual connectivity.

After step S1110, the user plane of both PDU sessions still go via MgNB.

Next, FIG. 12, which shows establishment of dual connectivity subsequent to the setup of two PDUs sessions shown in FIG. 11, is described.

Step S1200: If feasible, based on RAN conditions as evaluated by the MgNB, dual connectivity is established in RAN. RAN should observe the requests sent in steps S1100 and S11120 and set up dual connectivity in such a way that the user plane of PDU session 2 will be handled in SgNB as a SCG bearer, while the user plane of PDU session 1 will be handled in the MgNB as a MCG bearer. As part of the dual connectivity setup, data forwarding can be started from MgNB to SgNB for the data of PDU session 2.

If dual connectivity is not possible to be set up in RAN as requested by the CN, then an appropriate indication is sent from RAN for both PDU sessions via the AMF to the appropriate SMFs. The SMFs may decide whether to release the given PDU sessions.

Step S1210: The user plane path of PDU session 2 is switched from MgNB to SgNB.

As a result, the user plane of PDU session 1 and PDU session 2 now take independent paths both in RAN and in the CN.

However, the above described solution for higher layer multi-connectivity does not consider UE mobility. For example, if the inter-gNB handover occurs, it may be important to keep two redundant PDU sessions for that UE in URLLC. However, in this scenario, it may be difficult for the target MN of the inter-gNB handover to know that it should make paths of the two redundant PDU sessions independent. Specifically, the above described solution is based on the dual connectivity feature that is supported both by LTE and NR. Therefore, it is also needed to transfer context data from a source MN to a target MN while the context at the SN is kept (i.e., without SN change) or moved to another SN (i.e., with SN change). Considering the inter-gNB handover, a method for making paths of the two redundant PDU sessions independent and keeping dual connectivity may be required.

In addition, establishment of dual connectivity may fail. For example, when the target SN of inter-gNB handover cannot accept and/or admit the PDU session currently served via the SCG bearer, establishment of dual connectivity may fail. In this case, the SMF may decide whether to continue with the PDU session or initiate release of the PDU session. In order to make a decision, however, it may be required for the SMF to acquire additional information (e.g., failure indication for dual connectivity, PDU session setup/reject at MN and/or SN) from the NG-RAN. Therefore, a method for forwarding the result of a PDU session setup/reject and dual connectivity to the SMF may be required.

1. Embodiment 1-1 of the Present Disclosure

According to the embodiment 1-1 of the present disclosure, the source MN may transmit information related to the RSN to the target MN. The information related to the RSN may be originally provided by the UE to the source MN, as shown in FIG. 11. The value of the RSN may inform whether the first or the second PDU session is being established.

For example, the source MN may indicate, to the target MN, information related to mapping relationship between the RSN and the PDU session ID for MCG and/or SCG bearer. The information related to the RSN transmitted from the source MN to the target MN may enable the target MN to be aware which PDU session should be allocated to the target SN for redundant transmission. When the PDU sessions are handed over, it may be explicitly requested that RAN handles the first PDU session at the target MN and the second PDU session at the SN using dual connectivity.

For example, the source MN may transmit information related to RSN #1 and information related to RSN #2 to the target MN. The information related to RSN #1 may inform that RSN #1 is mapped/related to PDU session #1. The information related to RSN #1 may inform that the PDU session #1 is currently served via the MCG bearer. The information related to RSN #1 may inform that the PDU session #1 is requested to be handled by the MN. The information related to RSN #2 may inform that RSN #2 is mapped/related to PDU session #2. The information related to RSN #2 may inform that the PDU session #2 is currently served via the SCG bearer. The information related to RSN #2 may inform that the PDU session #2 is requested to be handled by the SN.

Upon receiving the information related to RSN #1 and information related to RSN #2 from the source MN, the target MN can know that the PDU session #2 mapped to the RSN #2 is currently served by the (source) SN. The target MN can also know that the two PDU sessions are established for redundant transmission. Therefore, the target MN can allocate one of the PDU session #1 or the PDU session #2 to the (target) SN for redundant transmission. For example, the target MN can allocate the PDU session #2 mapped to the RSN #2 to the (target) SN for redundant transmission.

In some implementations of the embodiment 1-1 of the present disclosure, if the target MN or the (target) SN fails to establish the PDU session for each RSN, target MN may indicate to the source MN and/or SMF that dual connectivity cannot be set up in RAN as requested by the CN.

Figure 13:
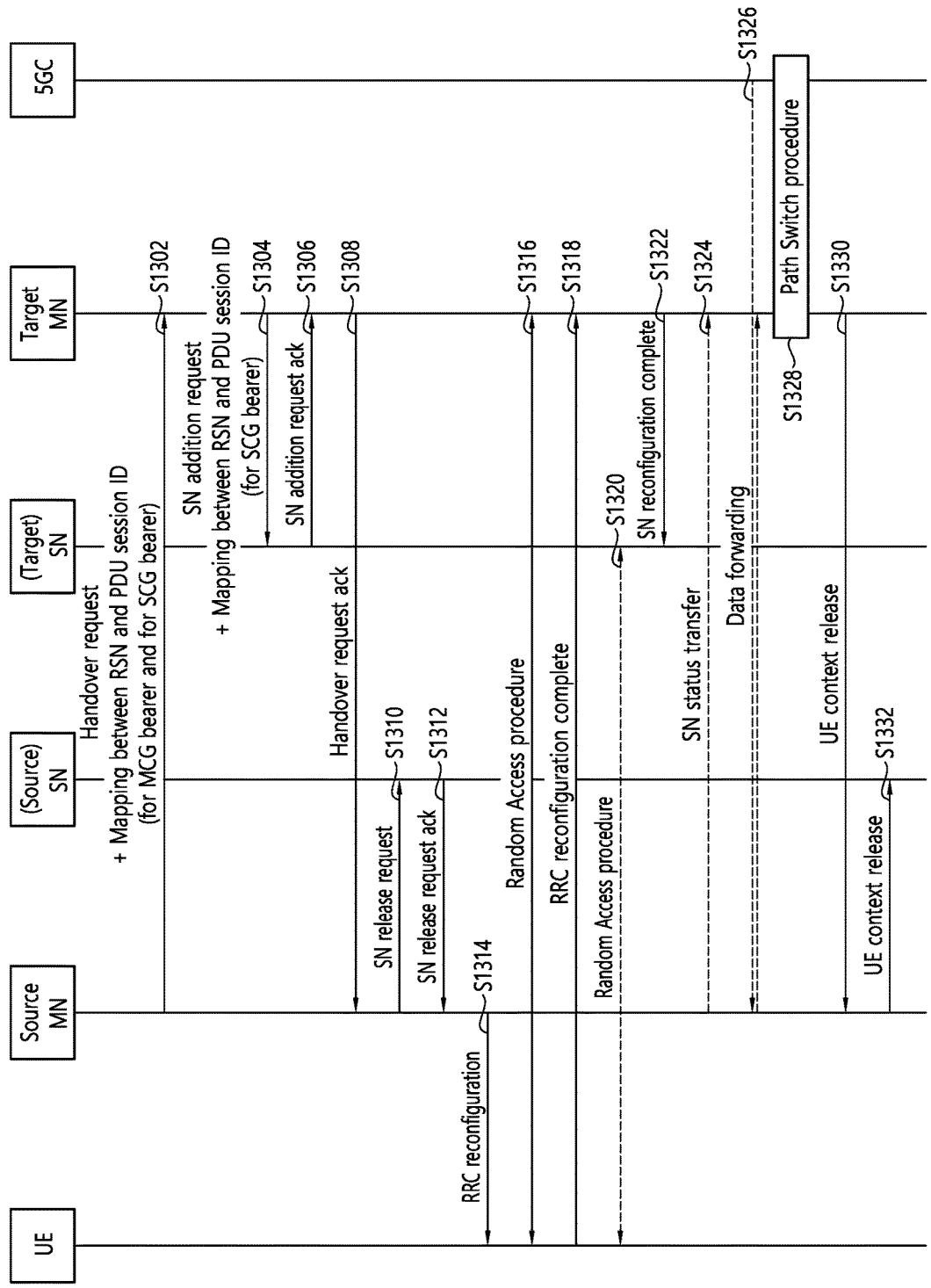
FIG. 13 shows an example of inter-MN handover with/without MN initiated SN change procedure according to the embodiment 1-1 of the present disclosure.

FIG. 13 shows an example of inter-MN handover with/without MN initiated SN change procedure according to the embodiment 1-1 of the present disclosure.

FIG. 13 shows a successful case for the inter-MN handover with/without MN initiated SN change procedure in higher layer multi-connectivity. That is, the (target) SN can accept and/or admit the PDU session currently served via the SCG bearer for redundant transmission so that the dual connectivity can be established for redundant transmission after the inter-MN handover with/without MN initiated SN change procedure. For an inter-MN handover without SN change, the source SN and the target SN shown in FIG. 13 are the same node.

Step S1302: The source MN starts the handover procedure by initiating the Xn Handover Preparation procedure. The source MN transmits a Handover Request message including both MCG and SCG configuration to the target MN. The source MN may include the source SN UE XnAP ID, SN ID and the UE context in the source SN in the Handover Request message. The Handover Request message may also include information related to the RSN. The information related to the RSN may include information related to mapping relationship between the RSN and PDU session ID for MCG and/or SCG bearer. The information related to the RSN may be used to indicate to the target MN which PDU session should be allocated to the target SN for redundant transmission. The value of the RSN may indicate that each PDU session is requested to be handled by the MN or SN, respectively.

For example, the Handover Request message may include information related to RSN #1 and information related to RSN #2. The information related to RSN #1 may inform that RSN #1 is mapped/related to PDU session #1. The information related to RSN #1 may inform that the PDU session #1 is currently served via the MCG bearer. The information related to RSN #1 may inform that the PDU session #1 is requested to be handled by the MN. The information related to RSN #2 may inform that RSN #2 is mapped/related to PDU session #2. The information related to RSN #2 may inform that the PDU session #2 is currently served via the SCG bearer. The information related to RSN #2 may inform that the PDU session #2 is requested to be handled by the SN.

Step S1304: Upon reception of the information related to the RSN in the Handover Request message, the target MN can be aware of which PDU session is being established for redundancy. The target MN can determine/identify which PDU session is being established for redundancy.

For example, upon receiving the information related to RSN #1 and information related to RSN #2 as described in step S1302, the target MN can know/determine that one of the PDU session #1 mapped to the RSN #1 or the PDU session #2 mapped to the RSN #2 should be handled by the (target) SN for redundant transmission and so should be allocated to the (target) SN.

If the target MN decides to keep the source SN, the target MN sends SN Addition Request message to the SN including the SN UE XnAP ID as a reference to the UE context in the SN that was established by the source MN. If the target MN decides to change the SN, the target MN sends the SN Addition Request message to the target SN including the UE context in the source SN that was established by the source MN. The SN Addition Request message may also include the information related to the RSN for SCG bearer. Based on this information, the (target) SN can be aware that the PDU session indicated by the information related to the RSN for SCG bearer should be allocated for redundant transmission.

For example, the target MN may transmit SN Addition Request message including the information related to the RSN #2 to the (target) SN. Upon receiving the information related to the RSN #2, the (target) SN can know that the PDU session #2 should be allocated for redundant transmission.

Step S1306: The (target) SN replies with SN Addition Request Acknowledge message to the target MN. The (target) SN may include the indication of the full or delta RRC configuration in the SN Addition Request Acknowledge message. In this example, it is assumed that the (target) SN admits the PDU session indicated by the information related to the RSN for SCG bearer. The (target) SN can set up the PDU session related to the RSN for SCG bearer.

Step S1308: The target MN includes within the Handover Request Acknowledge message a transparent container to be sent to the UE as an RRC message to perform the handover, and may also provide forwarding addresses to the source MN. The target MN may indicate to the source MN that the UE context in the SN is kept if the target MN and the SN decided to keep the UE context in the SN in step S1304 and step S1306.

Step S1310: The source MN sends SN Release Request message to the (source) SN including a cause indicating MCG mobility. The source MN indicates to the (source) SN that the UE context in SN is kept, if it receives the indication from the target MN. If the indication as the UE context kept in SN is included, the (source) SN keeps the UE context.

Step S1312: The (source) SN acknowledges the release request.

Step S1314: The source MN triggers the UE to perform handover and apply the new configuration.

Step S1316: The UE synchronizes to the target MN.

Step S1318: The UE replies with MN RRC reconfiguration complete message.

Step S1320: If configured with bearers requiring SCG radio resources, the UE may synchronize to the (target) SN.

Step S1322: If the RRC connection reconfiguration procedure was successful, the target MN informs the (target) SN via SN Reconfiguration Complete message.

Step S1324: For bearers using RLC AM, the source MN sends the SN Status transfer to the target MN.

Step S1326: Data forwarding from the source MN takes place. If the SN is kept, data forwarding may be omitted for SCG bearers and SCG split bearers.

Step S1328: The target MN initiates the Path Switch procedure.

Step S1330: The target MN initiates the UE Context Release procedure towards the source MN.

Step S1332: Upon reception of the UE Context Release message from source MN, the (source) SN can release C-plane related resource associated to the UE context towards the source MN. Any ongoing data forwarding may continue. The SN shall not release the UE context associated with the target MN if the indication was included in the SN Release Request message in step S1310.

According to the embodiment 1-1 of the present disclosure, for support of UE mobility in URLLC, the target MN and (target) SN can continuously allocate the PDU session to each RSN as requested by CN. For example, redundant transmission for higher layer multi-connectivity can be performed efficiently after inter-MN handover with/without MN initiated SN change procedure. For example, the UE's experience can be enhanced since the reliability for the data transmission can be improved.

2. Embodiment 1-2

The embodiment 1-2 of the present disclosure describes modification of the embodiment 1-2 of the present disclosure in which the source MN may transmit information related to the RSN to the target MN.

Figure 14:
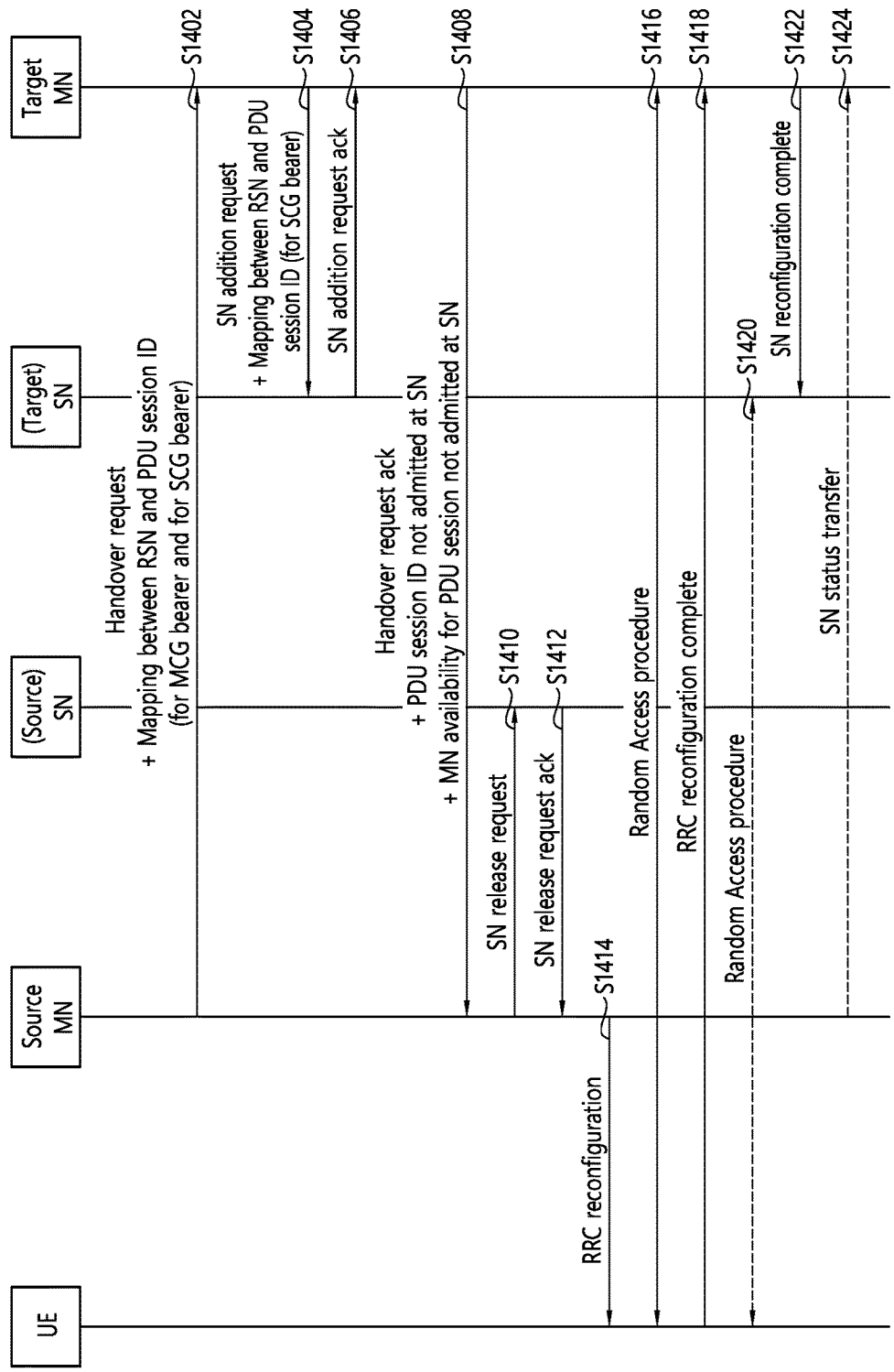
FIG. 14 and FIG. 15 show another example of inter-MN handover with/without MN initiated SN change procedure according to the embodiment 1-2 of the present disclosure.
Figure 15:
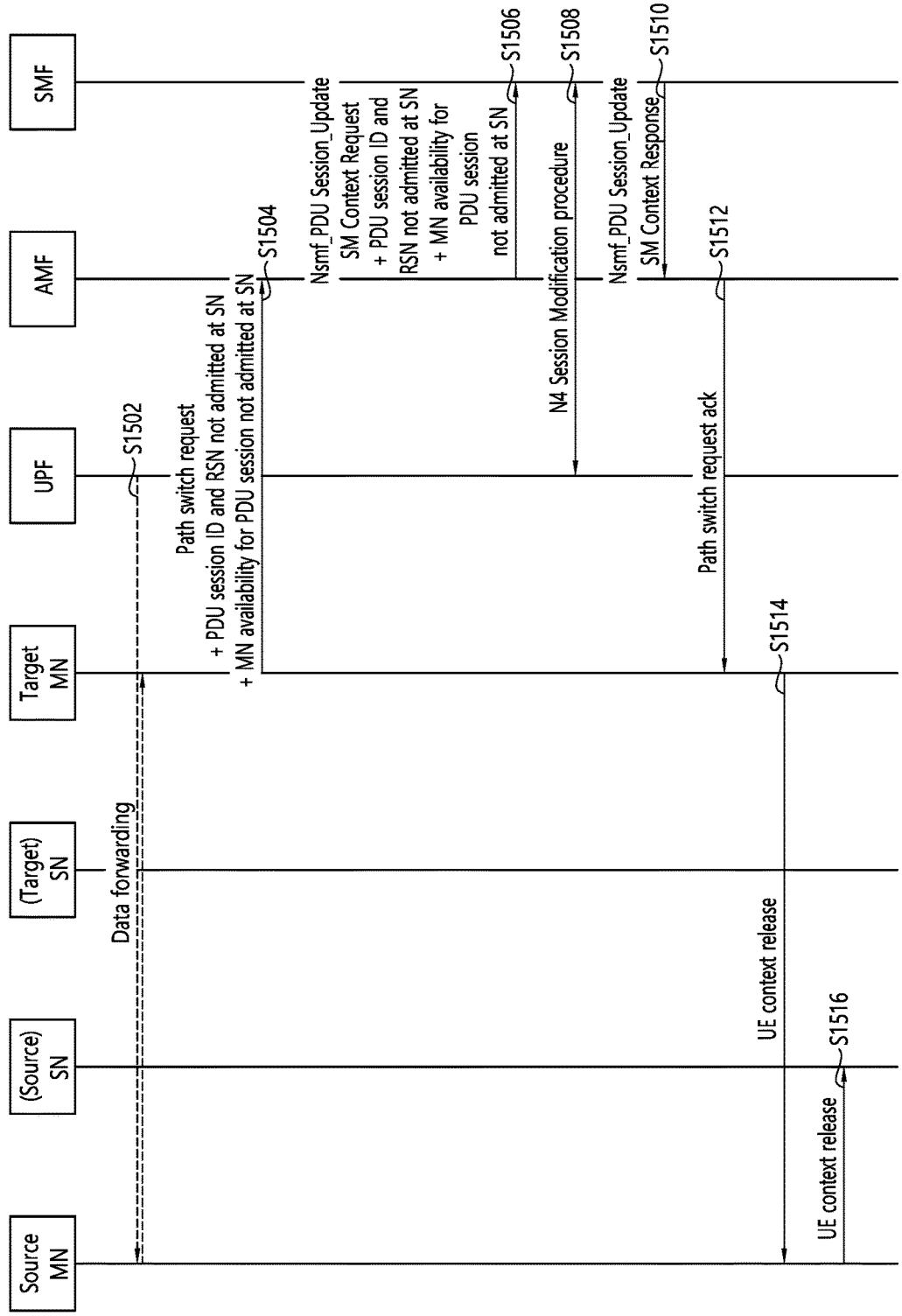

FIG. 14 and FIG. 15 show another example of inter-MN handover with/without MN initiated SN change procedure according to the embodiment 1-2 of the present disclosure.

FIG. 14 and FIG. 15 show a failure case for the inter-MN handover with/without MN initiated SN change procedure in higher layer multi-connectivity. That is, the (target) SN cannot accept and/or admit the PDU session currently served via the SCG bearer for redundant transmission so that the dual connectivity cannot be established for redundant transmission after the inter-MN handover with/without MN initiated SN change procedure. For an inter-MN handover without SN change, the source SN and the target SN shown in FIG. 14 and FIG. 15 are the same node.

First, FIG. 14 is described.

Step S1402: The source MN starts the handover procedure by initiating the Xn Handover Preparation procedure. The source MN transmits a Handover Request message including both MCG and SCG configuration to the target MN. The source MN may include the source SN UE XnAP ID, SN ID and the UE context in the source SN in the Handover Request message. The Handover Request message may also include information related to the RSN. The information related to the RSN may include information related to mapping relationship between the RSN and PDU session ID for MCG and/or SCG bearer. The information related to the RSN may be used to indicate to the target MN which PDU session should be allocated to the target SN for redundant transmission. The value of the RSN may indicate that each PDU session is requested to be handled by the MN or SN, respectively.

For example, the Handover Request message may include information related to RSN #1 and information related to RSN #2. The information related to RSN #1 may inform that RSN #1 is mapped/related to PDU session #1. The information related to RSN #1 may inform that the PDU session #1 is currently served via the MCG bearer. The information related to RSN #1 may inform that the PDU session #1 is requested to be handled by the MN. The information related to RSN #2 may inform that RSN #2 is mapped/related to PDU session #2. The information related to RSN #2 may inform that the PDU session #2 is currently served via the SCG bearer. The information related to RSN #2 may inform that the PDU session #2 is requested to be handled by the SN.

Step S1404: Upon reception of the information related to the RSN in the Handover Request message, the target MN can be aware of which PDU session is being established for redundancy. The target MN can determine which PDU session is being established for redundancy.

For example, upon receiving the information related to RSN #1 and information related to RSN #2 as described in step S1402, the target MN can know/determine that one of the PDU session #1 mapped to the RSN #1 or the PDU session #2 mapped to the RSN #2 should be handled by the (target) SN for redundant transmission and so should be allocated to the (target) SN.

If the target MN decides to keep the source SN, the target MN sends SN Addition Request message to the SN including the SN UE XnAP ID as a reference to the UE context in the SN that was established by the source MN. If the target MN decides to change the SN, the target MN sends the SN Addition Request message to the target SN including the UE context in the source SN that was established by the source MN. The SN Addition Request message may also include the information related to the RSN for SCG bearer. Based on this information, the (target) SN can be aware that the PDU session indicated by the information related to the RSN for SCG bearer should be allocated for redundant transmission.

For example, the target MN may transmit SN Addition Request message including the information related to the RSN #2 to the (target) SN. Upon receiving the information related to the RSN #2, the (target) SN can know that the PDU session #2 should be allocated for redundant transmission.

Step S1406: Except for the PDU session indicated by the information related to the RSN for SCG bearer received in step S1404, if the RRM entity in the (target) SN is able to admit at least one other resource request, the (target) SN replies with SN Addition Request Acknowledge message to the target MN. Then, the (target) SN may indicate to the target MN that the (target) SN fails to set up the PDU session related to the RSN for SCG bearer. The (target) SN may include the indication of the full or delta RRC configuration in the SN Addition Request Acknowledge message.

For example, the (target) SN may determine not to admit the PDU session #2 which is indicated by the information related to RSN #2. The (target) SN may determine that the PDU session #2 is failed to be set up. The target (SN) may indicate to the target MN that the (target) SN fails to set up the PDU session #2.

Step S1408: The target MN includes within the Handover Request Acknowledge message a transparent container to be sent to the UE as an RRC message to perform the handover, and may also provide forwarding addresses to the source MN. The target MN may indicate to the source MN that the UE context in the SN is kept if the target MN and the SN decided to keep the UE context in the SN in step S1404 and step S1406.

If the (target) SN does not admit to allocate the PDU session related to the RSN for SCG bearer in step S1406, the target MN may report to the source MN and 5GC that dual connectivity is not possible to be set up in RAN as requested by the CN. Therefore, the ID of the PDU session not admitted at the (target) SN may be included into the Handover Request Acknowledge message.

For example, the Handover Request Acknowledge message may include the ID of the PDU session #2 not admitted at the (target) SN.

The Handover Request Acknowledge message may include information related to MN availability for PDU session not admitted at the (target) SN. For example, if the (target) SN does not admit to allocate the PDU session related to the RSN for SCG bearer in step S1406, the target MN may also need to check/determine whether the target MN can allocate the MCG radio resources to the PDU session not admitted at the (target) SN. If the target MN can allocate the MCG radio resources to the PDU session not admitted at the (target) SN and/or establish the PDU session not admitted at the (target) SN, the target MN may also indicate to the source MN and the 5GC that only the target MN can establish both redundant PDU sessions without dual connectivity.

Alternatively, for example, when the PDU session related to the RSN for SCG bearer is not accepted by the (target) SN but it is possible to be admitted by the target MN, the target MN may report to the source MN that this PDU session is rejected. Based on this information, the source MN may choose a new target MN instead of already selected target MN.

Reporting to the 5GC will be further described in FIG. 15.

Step S1410: The source MN sends SN Release Request message to the (source) SN including a cause indicating MCG mobility. The source MN indicates to the (source) SN that the UE context in SN is kept, if it receives the indication from the target MN. If the indication as the UE context kept in SN is included, the (source) SN keeps the UE context.

Step S1412: The (source) SN acknowledges the release request.

Step S1414: The source MN triggers the UE to perform handover and apply the new configuration.

Step S1416: The UE synchronizes to the target MN.

Step S1418: The UE replies with MN RRC reconfiguration complete message.

Step S1420: If configured with bearers requiring SCG radio resources, the UE may synchronize to the (target) SN.

Step S1422: If the RRC connection reconfiguration procedure was successful, the target MN informs the (target) SN via SN Reconfiguration Complete message.

Step S1424: For bearers using RLC AM, the source MN sends the SN Status transfer to the target MN.

Next, FIG. 15, of which procedure follows the procedure shown in FIG. 14, is described.

Step S1502: Data forwarding from the source MN takes place. If the SN is kept, data forwarding may be omitted for SCG bearers and SCG split bearers.

Step S1504: The target MN initiates the Path Switch procedure by transmitting (PDU Session) Path Switch Request message to the AMF. If the (target) SN decides not to allocate the PDU session related to the RSN for SCG bearer in step S1406 of FIG. 14, the target MN may indicate to the 5GC that the PDU session related to the RSN for SCG bearer is not admitted at the (target) SN. Therefore, the ID of the PDU session not admitted at the (target) SN may be included into the (PDU Session) Path Switch Request message.

For example, the (PDU Session) Path Switch Request message may include the ID of the PDU session #2 not admitted at the (target) SN.

Furthermore, the (PDU Session) Path Switch Request message may include information related to MN availability for PDU session not admitted at the (target) SN. If the target MN can establish the PDU session not admitted at the (target) SN, the target MN may also report to the 5GC that the PDU session not admitted at the (target) SN can be handled by the target MN without the dual connectivity.

Step S1506: The AMF sends to the SMF the Nsmf_P-DUSession_UpdateSMContext Request message containing the ID of the PDU session and/or RSN not admitted at the (target) SN. In addition, if the target MN can establish the PDU session not admitted at the (target) SN, the information related to MN availability for PDU session not admitted at the (target) SN may also be delivered to the SMF via the Nsmf_PDUSession_UpdateSMContext Request message.

Step S1508: If the (target) SN decides not to allocate the PDU session related to the RSN for SCG bearer in step S1406 of FIG. 14, SMFs may decide whether to release the given PDU session. That is, upon receiving the Nsmf_P-DUSession_UpdateSMContext Request message including the ID of the PDU session and/or RSN not admitted at the (target) SN and/or information related to the MN availability for PDU session not admitted at the (target) SN, the SMF may determine whether to release the corresponding PDU session not admitted at the (target) SN. In addition, the SMF may take into account the result about whether the target MN can establish the PDU session not admitted at the (target) SN.

For example, the SMF may determine whether to continue the PDU session #2 for redundant transmission. The SMF may determine whether to release the PDU session #2.

For a PDU session to be switched to the target MN, the SMF may determine whether the existing UPF can continue to serve the UE.

Step S1510: The SMF sends an Nsmf_PDUSession_UpdateSMContext response message to the AMF for PDU Sessions which have been switched successfully.

Step S1512: The AMF responses to the target MN with the (PDU Session) Path Switch Request Acknowledge message.

Step S1514: The target MN initiates the UE Context Release procedure towards the source MN.

Step S1516: Upon reception of the UE Context Release message from source MN, the (source) SN can release C-plane related resource associated to the UE context towards the source MN. Any ongoing data forwarding may continue. The SN shall not release the UE context associated with the target MN if the indication was included in the SN Release Request message in step S1410 of FIG. 14.

In summary, according to the embodiment 1-2 of the present disclosure, using NG-RAN local configuration, NG-RAN may determine whether the request to establish RAN resources for a PDU session is fulfilled or not considering user plane requirements indicated by the RSN parameter by means of dual connectivity. If the request to establish RAN resources for PDU Session can be fulfilled by the RAN, the PDU session may be established even if the user plane requirements indicated by RSN cannot be satisfied. If the NG-RAN determines the request to establish RAN resources cannot be fulfilled, then the NG-RAN shall reject the request which may eventually trigger the SMF to reject the PDU session establishment towards the UE. The decision for each PDU session may be taken independently (i.e. rejection of a PDU session request shall not release the previously established PDU session). The RAN may determine whether to notify the SMF in case the RAN resources indicated by the RSN parameter can no longer be maintained and SMF can use that to determine if the PDU session should be released.

According to the embodiment 1-2 of the present disclosure, for failure about the dual connectivity, the SMF can efficiently decide whether to continue with the PDU session not admitted at the (target) SN or release the PDU session. For example, the UE's experience can be enhanced since the reliability for the data transmission can be improved.

3. Embodiment 2 of the Present Disclosure

According to the embodiment 2-1 of the present disclosure, the source MN may transmit information related to the RSN to the target MN. For example, the source MN may indicate, to the target MN, information related to mapping relationship between the RSN and the PDU session ID for MCG and/or SCG bearer. The information related to the RSN transmitted from the source MN to the target MN may enable the target MN to be aware which PDU session should be allocated to the target SN for redundant transmission by CN.

In addition, according to the embodiment 2 of the present disclosure, the source MN may indicate to the target MN that remapping for the PDU sessions is allowed. The remapping for the PDU sessions means that the target MN can change mapping relationship between the RSN and PDU session ID for MCG and SCG bearer based on the resource status.

For example, the source MN may transmit information related to RSN #1 and information related to RSN #2 to the target MN. The information related to RSN #1 may inform that RSN #1 is mapped/related to PDU session #1. The information related to RSN #1 may inform that the PDU session #1 is currently served via the MCG bearer. The information related to RSN #1 may inform that the PDU session #1 is requested to be handled by the MN. The information related to RSN #2 may inform that RSN #2 is mapped/related to PDU session #2. The information related to RSN #2 may inform that the PDU session #2 is currently served via the SCG bearer. The information related to RSN #2 may inform that the PDU session #2 is requested to be handled by the SN.

Furthermore, the source MN may transmit information informing that remapping for the PDU sessions is allowed.

Upon receiving the information related to RSN #1, information related to RSN #2 from the source MN, the target MN can know that the PDU session #2 mapped to the RSN #2 is currently served by the (source) SN. The target MN can also know/determine that at least one of the PDU session #1 mapped to the RSN #1 or the PDU session #2 mapped to the RSN #2 should be handled by the (target) SN for redundant transmission. Therefore, the target MN can allocate at least one of the PDU session #1 or the PDU session #2 to the (target) SN for redundant transmission.

Furthermore, upon receiving the information informing that remapping for the PDU sessions is allowed, the target MN can perform remapping for the PDU sessions based on resource status. For example, the target MN can map the RSN #1 to the PDU session #2 for SCG bearer, and the RSN #2 to the PDU session #1 for MCG bearer.

Figure 16:
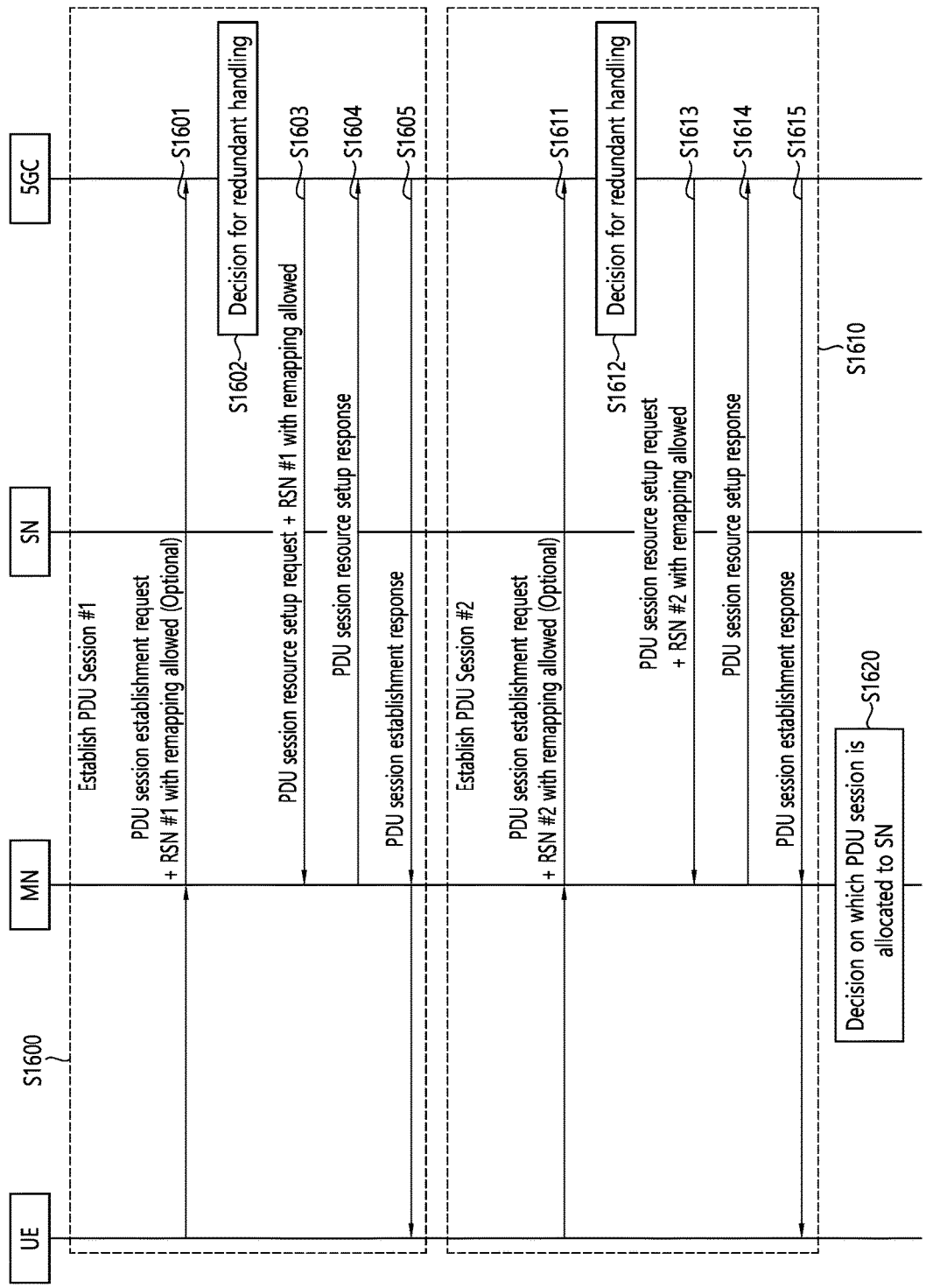
FIG. 16 and FIG. 17 show an example of a PDU setup procedure with remapping according to the embodiment 2 of the present disclosure.
Figure 17:
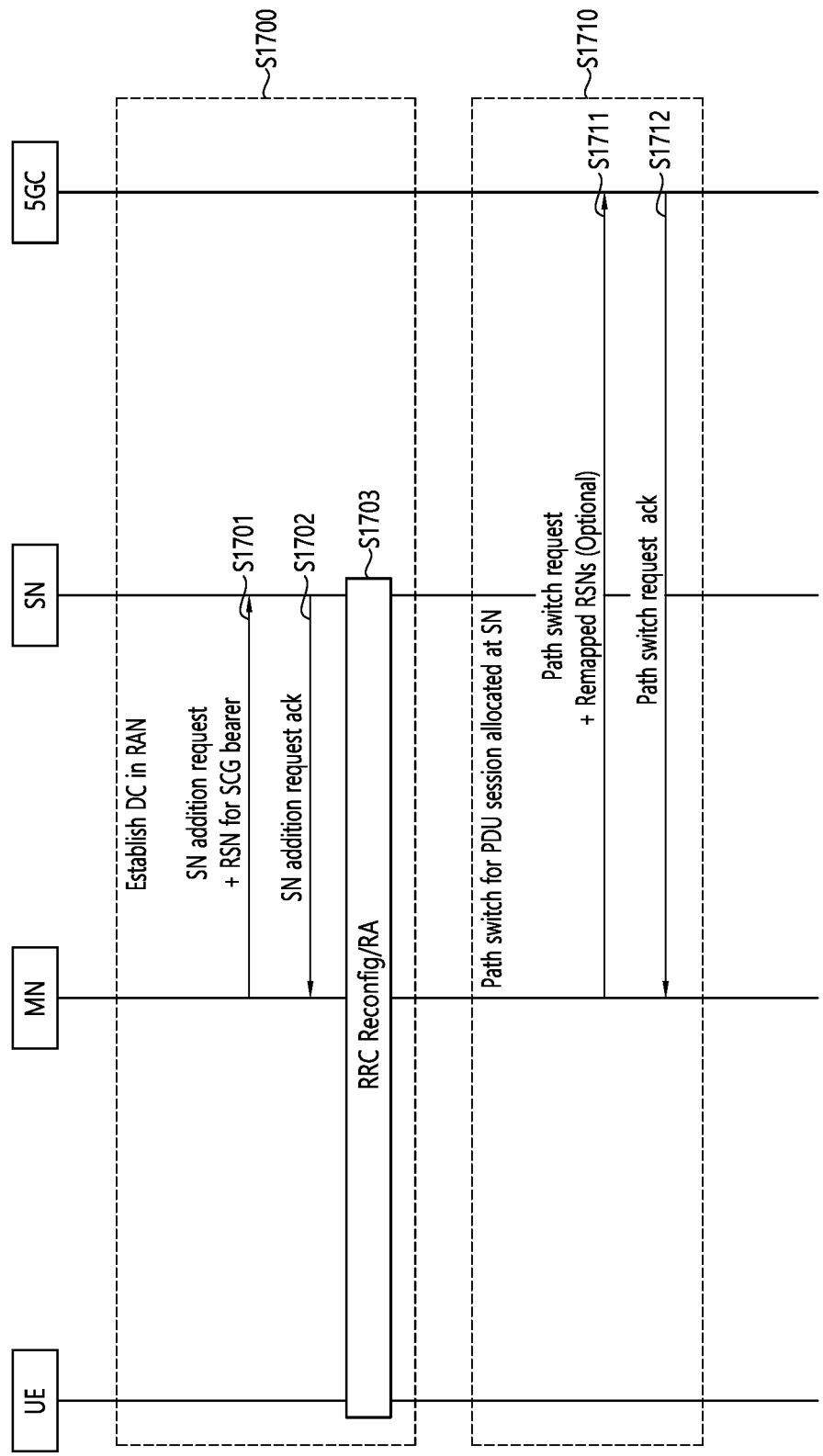

FIG. 16 and FIG. 17 show an example of a PDU setup procedure with remapping according to the embodiment 2 of the present disclosure.

First, FIG. 16 is described. FIG. 16 shows an example of a setup procedure of two PDUs sessions.

In step S1600, PDU session #1 is established.

Step S1601: In order to establish a new PDU session (e.g., PDU session #1), the UE generates a new PDU session ID. The UE initiates the UE Requested PDU Session Establishment procedure by the transmission of a NAS message containing a PDU Session Establishment Request message within a NAS container to the 5GC. The PDU Session Establishment Request message may include information related to RSN (e.g., RSN #1) and/or PDU session ID. The PDU Session Establishment Request message may further include a remapping allowed indication which indicates that the RAN node can change mapping relationship between the RSN and PDU session ID for MCG and SCG bearer. Alternatively, the UE may use different DNN and/or S-NSSAIs for the PDU sessions so that the SMF can determine, considering operator configuration, whether the first or second PDU session is established.

Step S1602: The SMF determines that the PDU session establishment is for a redundant PDU session. The determination may be based on the information related to the RSN (e.g., RSN #1) and/or PDU session ID received from the UE. Or, the determination may be based on network configuration considering the DNN and/or the S-NSSAI.

Step S1603: The SMF then provides the information related to the RSN (e.g., RSN #1) and/or PDU session ID within the PDU Session resource setup request message to the RAN (e.g., MN) via the AMF at user plane establishment for the PDU session. If the UE provides the information related to the RSN (e.g., RSN #1) with the remapping allowed indication in step S1601, or the remapping between the RSN and PDU session ID is allowed by network configuration, the SMF may indicate to the MN that the MN can select on its own whether those sessions are handled by MN or SN.

Step S1604: The MN responses to the SMF via the AMF with the PDU Session Resource Setup Response message.

Step S1605: The SMF sends a PDU Session Establishment Response message to the UE for PDU sessions which have been established successfully.

In step S1610, PDU session #2 is established.

Step S1611: In order to establish a new PDU session (e.g., PDU session #2), the UE generates a new PDU session ID. The UE initiates the UE Requested PDU Session Establishment procedure by the transmission of a NAS message containing a PDU Session Establishment Request message within a NAS container to the 5GC. The PDU Session Establishment Request message may include information related to RSN (e.g., RSN #2) and/or PDU session ID. The PDU Session Establishment Request message may further include a remapping allowed indication which indicates that the RAN node can change mapping relationship between the RSN and PDU session ID for MCG and SCG bearer. Alternatively, the UE may use different DNN and/or S-NSSAIs for the PDU sessions so that the SMF can determine, considering operator configuration, whether the first or second PDU session is established.

Step S1612: The SMF determines that the PDU session establishment is for a redundant PDU session. The determination may be based on the information related to the RSN (e.g., RSN #2) and/or PDU session ID received from the UE. Or, the determination may be based on network configuration considering the DNN and/or the S-NSSAI.

Step S1613: The SMF then provides the information related to the RSN (e.g., RSN #2) and/or PDU session ID within the PDU Session resource setup request message to the RAN (e.g., MN) via the AMF at user plane establishment for the PDU session. If the UE provides the information related to the RSN (e.g., RSN #2) with the remapping allowed indication in step S1601, or the remapping between the RSN and PDU session ID is allowed by network configuration, the SMF may indicate to the MN that the MN can select on its own whether those sessions are handled by MN or SN.

Step S1614: The MN responses to the SMF via the AMF with the PDU Session Resource Setup Response message.

Step S1615: The SMF sends a PDU Session Establishment Response message to the UE for PDU sessions which have been established successfully.

Step S1620: Based on the received information related to the RSN (e.g., RSN #1 and/or RSN #2) from the 5GC, the MN decides to set up dual connectivity in such a way that both the MN and the SN have an independent PDCP entity for handling the two independent user plane paths (i.e., setup of MCG bearer and SCG bearer for MN and SN, respectively). The user plane of the PDU session #2 mapped to the RSN #2 may be switched to the SN. In this way, both the RAN node and the UPF can be different for the two redundant PDU sessions.

If the remapping allowed indication is received, the MN can decide on which PDU session is allocated to the SN according to resources status. For example, the MN may decide that one of the PDU session #1 or PDU session #2 is allocated to the SN based on, e.g., MCG radio resource at the target MN, SCG radio resource at the target SN, respective transport network resources, etc.

Next, FIG. 17, which shows establishment of dual connectivity subsequent to the setup of two PDUs sessions shown in FIG. 16, is described.

In step S1700, the dual connectivity is established in RAN.

Step S1701: The MN sends the SN Addition Request message to the SN including information related to the RSN for SCG bearer.

Step S1702: The SN replies with SN Addition Request Acknowledge message. The SN may include the indication of the full or delta RRC configuration in the SN Addition Request Acknowledge message.

Step S1703: The UE and RAN initiates the RRC reconfiguration and RA procedure.

In step S1710: Path switch for PDU session allocated at the SN is performed.

Step S1711: The MN initiates the Path Switch procedure by transmitting the (PDU Session) Path Switch Request message to the 5GC. If the MN decides to change mapping relationship between the RSN and the PDU session ID in step S1620 of FIG. 16, information related to new mapping relationship may be included into the (PDU Session) Path Switch Request message.

Step S1712: The AMF responses to the MN with the (PDU Session) Path Switch Request Acknowledge message.

Figure 18:
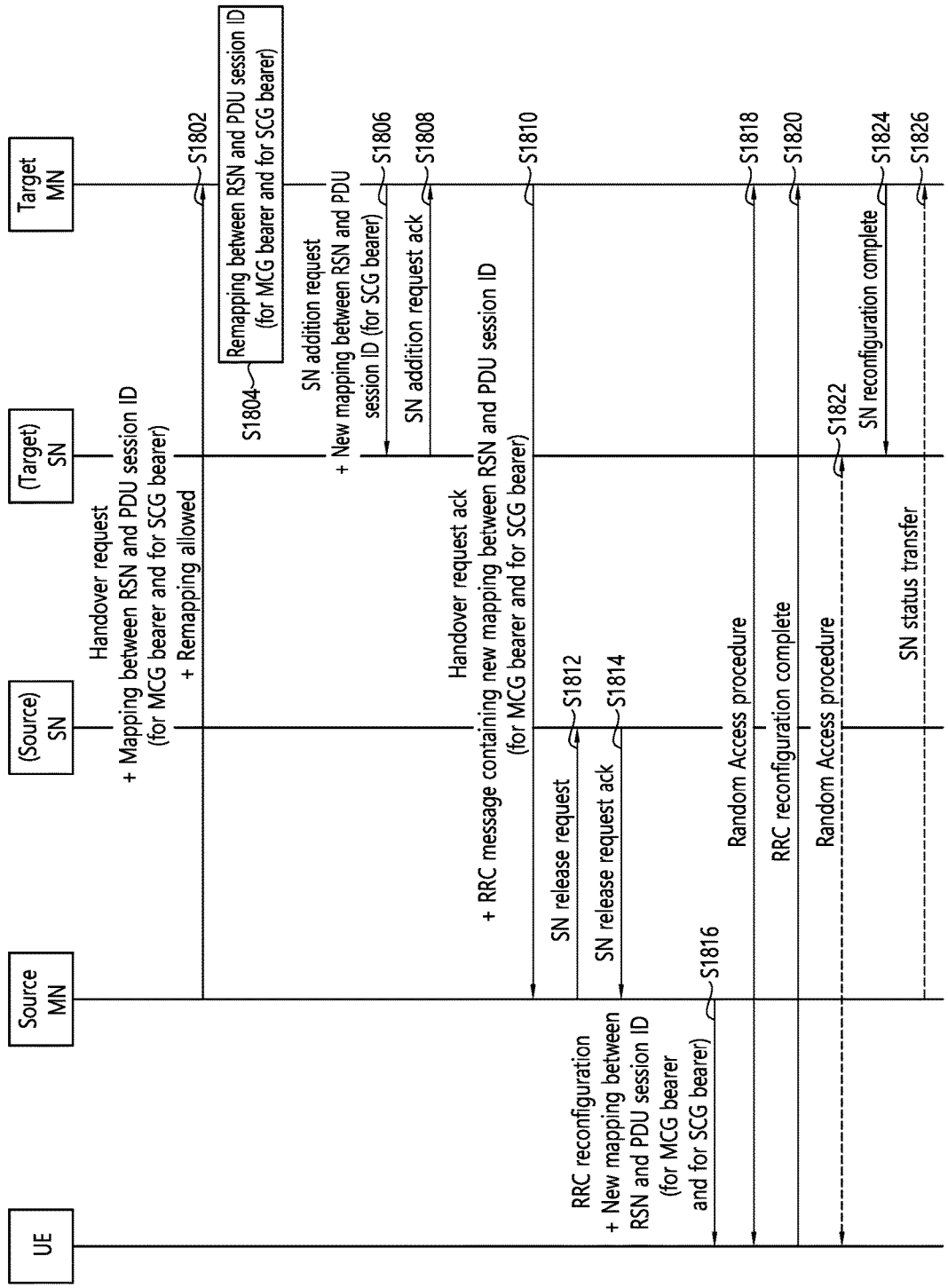
FIG. 18 and FIG. 19 show an example of inter-MN handover with/without MN initiated SN change procedure with remapping according to the embodiment 2 of the present disclosure.
Figure 19:
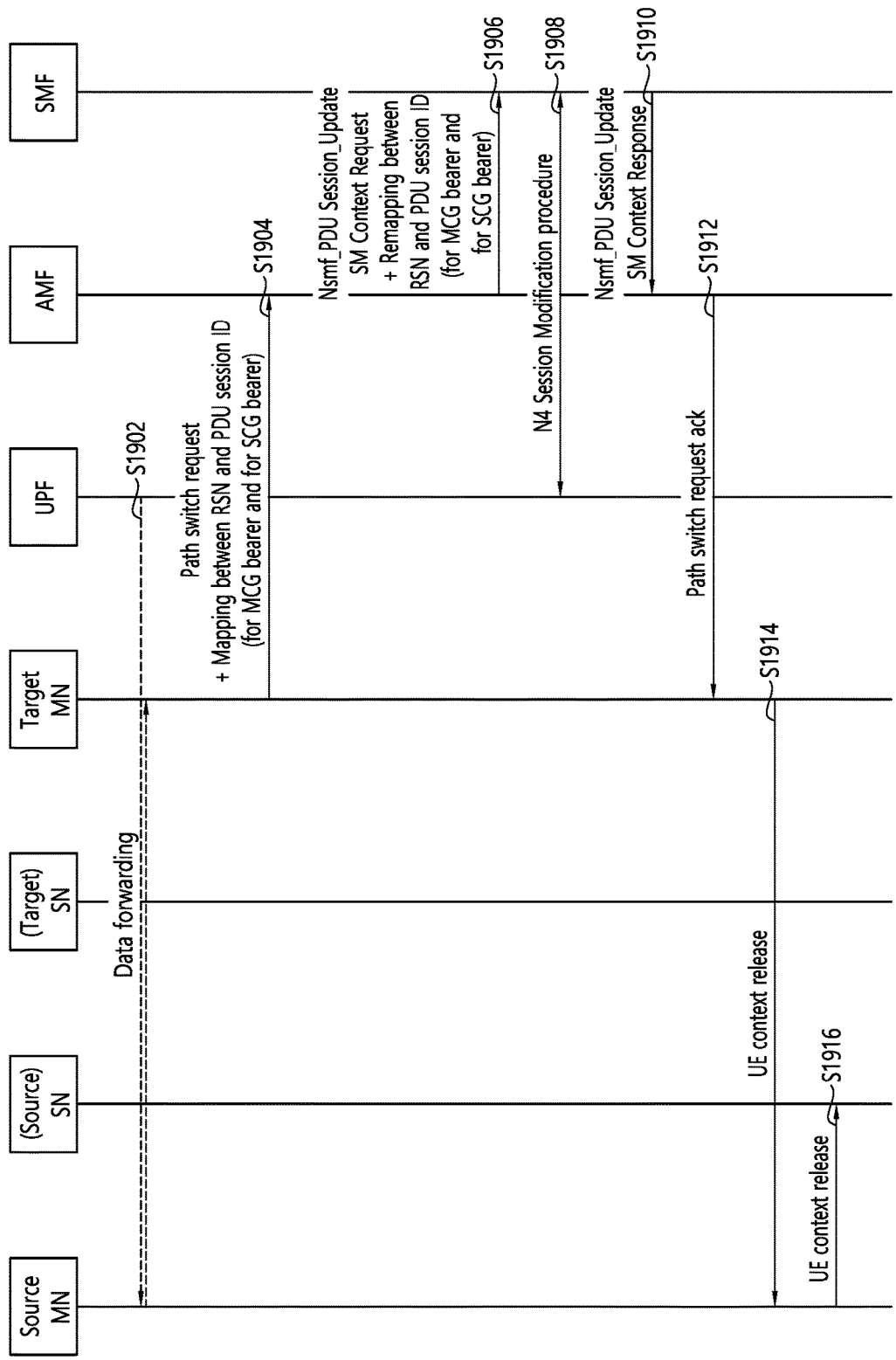

FIG. 18 and FIG. 19 show an example of inter-MN handover with/without MN initiated SN change procedure with remapping according to the embodiment 2 of the present disclosure.

For an inter-MN handover without SN change, the source SN and the target SN shown in FIG. 18 and FIG. 19 are the same node.

First, FIG. 18 is described.

Step S1802: The source MN starts the handover procedure by initiating the Xn Handover Preparation procedure. The source MN transmits a Handover Request message including both MCG and SCG configuration to the target MN. The source MN may include the source SN UE XnAP ID, SN ID and the UE context in the source SN in the Handover Request message. The Handover Request message may also include information related to the RSN. The information related to the RSN may include information related to mapping relationship between the RSN and PDU session ID for MCG and/or SCG bearer. The information related to the RSN may be used to indicate to the target MN which PDU session should be allocated to the target SN for redundant transmission. The value of the RSN may indicate that each PDU session is requested to be handled by the MN or SN, respectively.

The Handover Request message may further include a remapping allowed indication which indicates that the target MN is allowed to change the current mapping relationship between the RSN and PDU session ID for MCG and SCG bearer based on resource status of the target MN/SN (e.g., MCG radio resource at the target MN, SCG radio resource at the target SN, respective transport network resources, etc.).

For example, the Handover Request message may include information related to RSN #1 and information related to RSN #2. The information related to RSN #1 may inform that RSN #1 is mapped/related to PDU session #1. The information related to RSN #1 may inform that the PDU session #1 is currently served via the MCG bearer. The information related to RSN #1 may inform that the PDU session #1 is requested to be handled by the MN. The information related to RSN #2 may inform that RSN #2 is mapped/related to PDU session #2. The information related to RSN #2 may inform that the PDU session #2 is currently served via the SCG bearer. The information related to RSN #2 may inform that the PDU session #2 is requested to be handled by the SN. The Handover Request message may further include the remapping allowed indication which indicates that the target MN is allowed to change the current mapping relationship between the RSN and PDU session ID for MCG and SCG bearer based on resource status of the target MN/SN.

Step S1804: Upon reception of the information related to the RSN in the Handover Request message, the target MN can be aware of which PDU session is being established for redundancy. The target MN can determine which PDU session is being established for redundancy.

For example, upon receiving the information related to RSN #1 and information related to RSN #2 as described in step S1802, the target MN can know/determine that the PDU session #2 mapped to the RSN #2 is being established for redundant transmission.

Upon receiving the remapping allowed indication in the Handover Request message, the target MN changes mapping relationship between the RSN and PDU session ID based on the radio resource status at the target MN.

For example, the target MN may map the RSN #1 to the PDU session #2 for SCG bearer, and the RSN #2 to the PDU session #1 for MCG bearer, respectively.

Step S1806: If the target MN decides to keep the source SN, the target MN sends SN Addition Request message to the SN including the SN UE XnAP ID as a reference to the UE context in the SN that was established by the source MN. If the target MN decides to change the SN, the target MN sends the SN Addition Request message to the target SN including the UE context in the source SN that was established by the source MN. The SN Addition Request message may also include information related to the new mapping relationship between the RSN and PDU session ID for SCG bearer. Based on this information, the (target) SN can be aware that the PDU session indicated by the information related to the RSN for SCG bearer should be allocated for redundant transmission.

For example, the target MN may transmit SN Addition Request message including the information related to the RSN #2 to the (target) SN. Upon receiving the information related to the RSN #2, the (target) SN can know that the PDU session #1 should be allocated for redundant transmission.

Step S1808: The (target) SN replies with SN Addition Request Acknowledge message to the target MN. The (target) SN may include the indication of the full or delta RRC configuration in the SN Addition Request Acknowledge message.

Step S1810: The target MN includes within the Handover Request Acknowledge message a transparent container to be sent to the UE as an RRC message (e.g., RRC Reconfiguration message) to perform the handover, and may also provide forwarding addresses to the source MN. The RRC message may include the information related to the new mapping relationship between the RSN and PDU session ID for MCG bearer and/or SCG bearer. The target MN may indicate to the source MN that the UE context in the SN is kept if the target MN and the SN decided to keep the UE context in the SN in step S1806 and step S1808.

Step S1812: The source MN sends SN Release Request message to the (source) SN including a cause indicating MCG mobility. The source MN indicates to the (source) SN that the UE context in SN is kept, if it receives the indication from the target MN. If the indication as the UE context kept in SN is included, the (source) SN keeps the UE context.

Step S1814: The (source) SN acknowledges the release request.

Step S1816: The source MN triggers the UE to perform handover and apply the new configuration. If the RRC message (e.g., RRC Reconfiguration message) includes the information related to the new mapping relationship between the RSN and PDU session ID for MCG bearer and/or SCG bearer, the UE may remap each PDU session ID to different RSN.

Step S1818: The UE synchronizes to the target MN.

Step S1820: The UE replies with MN RRC reconfiguration complete message.

Step S1822: If configured with bearers requiring SCG radio resources, the UE may synchronize to the (target) SN.

Step S1824: If the RRC connection reconfiguration procedure was successful, the target MN informs the (target) SN via SN Reconfiguration Complete message.

Step S1826: For bearers using RLC AM, the source MN sends the SN Status transfer to the target MN.

Next, FIG. 19, of which procedure follows the procedure shown in FIG. 18, is described.

Step S1902: Data forwarding from the source MN takes place. If the SN is kept, data forwarding may be omitted for SCG bearers and SCG split bearers.

Step S1904: The target MN initiates the Path Switch procedure by transmitting the (PDU Session) Path Switch Request message to the AMF. If the target MN decides to change mapping relationship between the RSN and PDU session ID in step S1804 of FIG. 18, the (PDU Session) Path Switch Request message may include the information related to the new mapping relationship between the RSN and PDU session ID.

Step S1906: The AMF sends to the SMF the Nsmf_PDUSession_UpdateSMContext Request message containing the information related to the new mapping relationship between the RSN and PDU session ID.

Step S1908: If the information related to the new mapping relationship between the RSN and PDU session ID is received for a PDU session to be switched to the target MN, the SMF determines whether the existing UPF can continue to serve the UE.

Step S1910: The SMF sends an Nsmf_PDUSession_UpdateSMContext response message to the AMF for PDU sessions which have been switched successfully.

Step S1912: The AMF responses to the target MN with the (PDU Session) Path Switch Request Acknowledge message.

Step S1914: The target MN initiates the UE Context Release procedure towards the source MN.

Step S1916: Upon reception of the UE Context Release message from source MN, the (source) SN can release C-plane related resource associated to the UE context towards the source MN. Any ongoing data forwarding may continue. The SN shall not release the UE context associated with the target MN if the indication was included in the SN Release Request message in step S1812 of FIG. 18.

In summary, according to the embodiment 2 of the present disclosure, the SMF may determine whether the PDU session is to be handled redundantly. The determination is based on the policies provided by policy control function (PCF) for the PDU session, combination of the S-NSSAI, DNN, user subscription and local policy configuration. The SMF may use these inputs to determine the RSN which differentiates the PDU sessions that are handled redundantly and indicates redundant user plane requirements for the PDU sessions in NG-RAN.

According to the embodiment 2 of the present disclosure, for support of UE mobility in URLLC, the target MN and (target) SN can continuously allocate the PDU session to each RSN as requested by CN. For example, target MN and SN can remap the RSN to different PDU session ID according to its resource status. For example, the UE's experience can be enhanced since the reliability for the data transmission can be improved.

Figure 20:
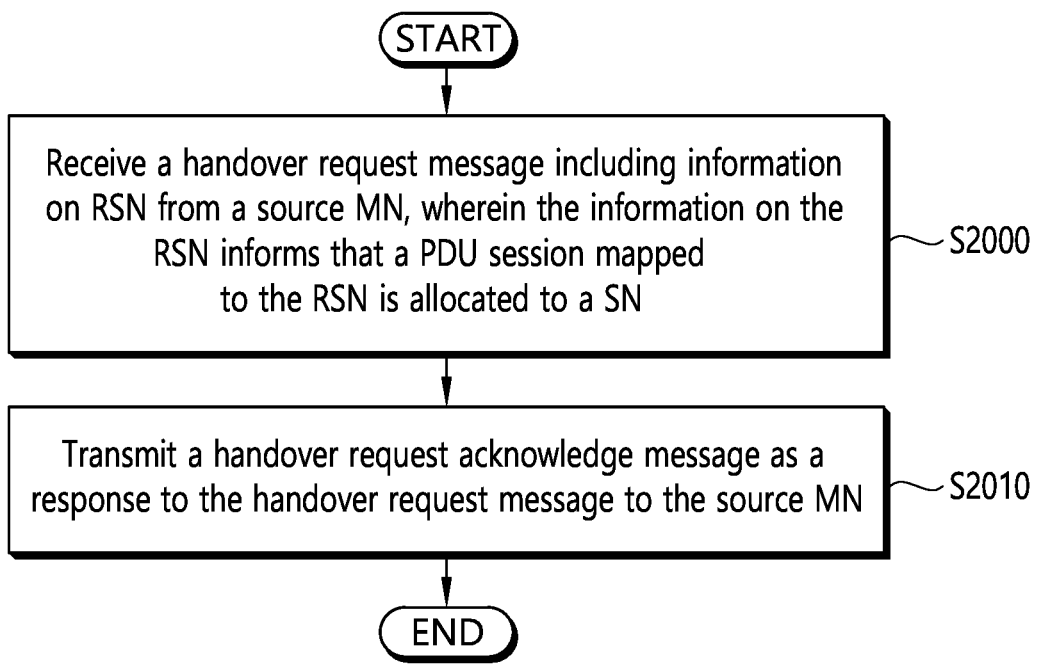
FIG. 20 shows an example of an inter-MN handover procedure according to an embodiment of the present disclosure.

FIG. 20 shows an example of an inter-MN handover procedure according to an embodiment of the present disclosure.

The above described embodiment of the present disclosure, i.e., embodiment 1-1, 1-2 and 2, can be applied to this example. Furthermore, a part of features described in each of the embodiment of the present disclosure can be applied in this example with combination. That is, this example may include at least one of the features described in embodiment 1-1, 1-2 and 2 of the present disclosure.

Currently, a wireless device is connected to both the source MN and a source SN in dual connectivity. The source MN is connected to a first SMF via a first UPF, and the source SN is connected to a second SMF via a second UPF. The SN may be a target SN different from the source SN, and in this case, the wireless device is to be connected to both the target MN and the target SN in dual connectivity after the inter-MN handover procedure. Alternatively, the SN may be the source SN, and in this case, the wireless device is to be connected to both the target MN and the source SN in dual connectivity after the inter-MN handover procedure.

In step S2000, the target MN of the inter-MN handover procedure receives a handover request message including information on a RSN from a source MN of the inter-MN handover procedure. The information on the RSN informs that a PDU session mapped to the RSN is allocated to a SN of the inter-MN handover procedure.

Upon receiving the handover request message including information on the RSN, the target MN may identify the PDU session allocated to the SN based on the information on the RSN. Then, the target MN may transmit an SN addition request message including the information on the RSN to the SN. The target MN may receive an SN addition request acknowledge message as a response to the SN addition request message from the SN.

In step S2010, the target MN transmits a handover request acknowledge message as a response to the handover request message to the source MN.

The SN addition request acknowledge message may include information informing that the PDU session is not admitted at the SN. In this case, the handover request acknowledge message may include at least one of the ID of the PDU session not admitted at the SN and/or information related to MN availability informing that the PDU session not admitted at the SN can be admitted by the target MN. The ID of the PDU session not admitted at the SN and/or information related to MN availability informing that the PDU session not admitted at the SN can be admitted by the target MN may also be transmitted to the core network.

Meanwhile, the handover request message may include information related to remapping for the PDU session. The target MN may remap between the RSN and the PDU session based on the information related to remapping. The handover request acknowledge message may include information related to the remapping between the RSN and the PDU session. The information related to the remapping between the RSN and the PDU session may also be transmitted to the core network.

The above description of the present disclosure may also be applied to the case where the MN initiates to set up the dual connectivity. In addition, the above description of the present disclosure may be considered in EN-DC and MR-DC in Rel-15 and future.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

Figure 21:
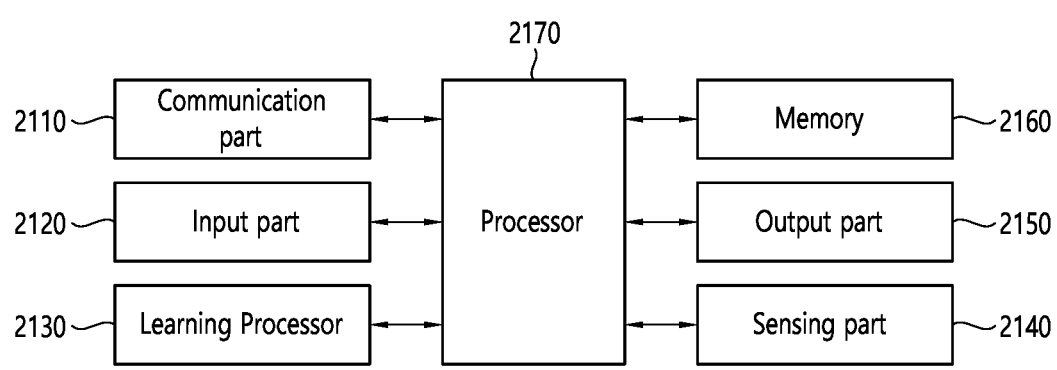
FIG. 21 shows an example of an AI device to which the technical features of the present disclosure can be applied.

FIG. 21 shows an example of an AI device to which the technical features of the present disclosure can be applied.

The AI device 2100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 21, the AI device 2100 may include a communication part 2110, an input part 2120, a learning processor 2130, a sensing part 2140, an output part 2150, a memory 2160, and a processor 2170.

The communication part 2110 can transmit and/or receive data to and/or from external devices such as the AI devices and the AI server using wire and/or wireless communication technology. For example, the communication part 2110 can transmit and/or receive sensor information, a user input, a learning model, and a control signal with external devices. The communication technology used by the communication part 2110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2120 can acquire various kinds of data. The input part 2120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2120 can acquire input data to be used when acquiring an output using learning data and a learning model for model learning. The input part 2120 may obtain raw input data, in which case the processor 2170 or the learning processor 2130 may extract input features by preprocessing the input data.

The learning processor 2130 may learn a model composed of an ANN using learning data. The learned ANN can be referred to as a learning model. The learning model can be used to infer result values for new input data rather than learning data, and the inferred values can be used as a basis for determining which actions to perform. The learning processor 2130 may perform AI processing together with the learning processor of the AI server. The learning processor 2130 may include a memory integrated and/or implemented in the AI device 2100. Alternatively, the learning processor 2130 may be implemented using the memory 2160, an external memory directly coupled to the AI device 2100, and/or a memory maintained in an external device.

The sensing part 2140 may acquire at least one of internal information of the AI device 2100, environment information of the AI device 2100, and/or the user information using various sensors. The sensors included in the sensing part 2140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2150 may generate an output related to visual, auditory, tactile, etc. The output part 2150 may include a display unit for outputting visual information, a speaker for outputting auditory information, and/or a haptic module for outputting tactile information.

The memory 2160 may store data that supports various functions of the AI device 2100. For example, the memory 2160 may store input data acquired by the input part 2120, learning data, a learning model, a learning history, etc.

The processor 2170 may determine at least one executable operation of the AI device 2100 based on information determined and/or generated using a data analysis algorithm and/or a machine learning algorithm. The processor 2170 may then control the components of the AI device 2100 to perform the determined operation. The processor 2170 may request, retrieve, receive, and/or utilize data in the learning processor 2130 and/or the memory 2160, and may control the components of the AI device 2100 to execute the predicted operation and/or the operation determined to be desirable among the at least one executable operation. The processor 2170 may generate a control signal for controlling the external device, and may transmit the generated control signal to the external device, when the external device needs to be linked to perform the determined operation. The processor 2170 may obtain the intention information for the user input and determine the user's requirements based on the obtained intention information. The processor 2170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2130 and/or learned by the learning processor of the AI server, and/or learned by their distributed processing. The processor 2170 may collect history information including the operation contents of the AI device 2100 and/or the user's feedback on the operation, etc. The processor 2170 may store the collected history information in the memory 2160 and/or the learning processor 2130, and/or transmit to an external device such as the AI server. The collected history information can be used to update the learning model. The processor 2170 may control at least some of the components of AI device 2100 to drive an application program stored in memory 2160. Furthermore, the processor 2170 may operate two or more of the components included in the AI device 2100 in combination with each other for driving the application program.

Figure 22:
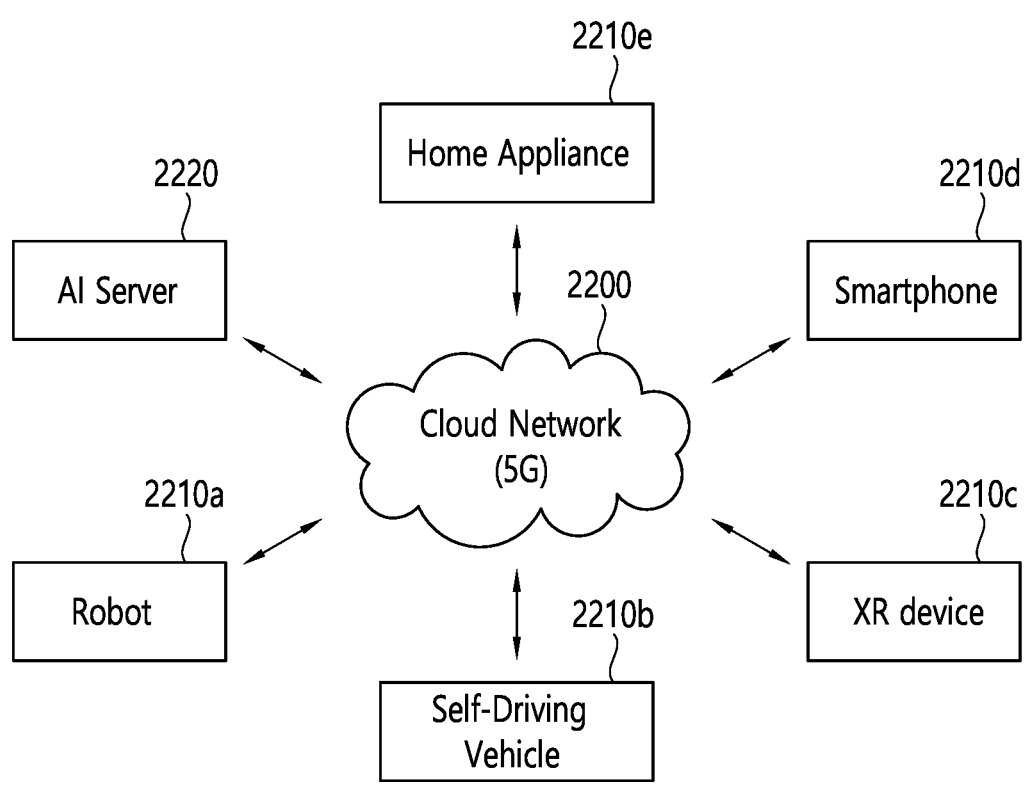
FIG. 22 shows an example of an AI system to which the technical features of the present disclosure can be applied.

FIG. 22 shows an example of an AI system to which the technical features of the present disclosure can be applied.

Referring to FIG. 22, in the AI system, at least one of an AI server 2220, a robot 2210a, an autonomous vehicle 2210b, an XR device 2210c, a smartphone 2210d and/or a home appliance 2210e is connected to a cloud network 2200. The robot 2210a, the autonomous vehicle 2210b, the XR device 2210c, the smartphone 2210d, and/or the home appliance 2210e to which the AI technology is applied may be referred to as AI devices 2210a to 2210e.

The cloud network 2200 may refer to a network that forms part of a cloud computing infrastructure and/or resides in a cloud computing infrastructure. The cloud network 2200 may be configured using a 3G network, a 4G or LTE network, and/or a 5G network. That is, each of the devices 2210a to 2210e and 2220 consisting the AI system may be connected to each other through the cloud network 2200. In particular, each of the devices 2210a to 2210e and 2220 may communicate with each other through a base station, but may directly communicate with each other without using a base station.

The AI server 2220 may include a server for performing AI processing and a server for performing operations on big data. The AI server 2220 is connected to at least one or more of AI devices constituting the AI system, i.e., the robot 2210a, the autonomous vehicle 2210b, the XR device 2210c, the smartphone 2210d and/or the home appliance 2210e through the cloud network 2200, and may assist at least some AI processing of the connected AI devices 2210a to 2210e. The AI server 2220 can learn the ANN according to the machine learning algorithm on behalf of the AI devices 2210a to 2210e, and can directly store the learning models and/or transmit them to the AI devices 2210a to 2210e. The AI server 2220 may receive the input data from the AI devices 2210a to 2210e, infer the result value with respect to the received input data using the learning model, generate a response and/or a control command based on the inferred result value, and transmit the generated data to the AI devices 2210a to 2210e. Alternatively, the AI devices 2210a to 2210e may directly infer a result value for the input data using a learning model, and generate a response and/or a control command based on the inferred result value.

Various embodiments of the AI devices 2210a to 2210e to which the technical features of the present disclosure can be applied will be described. The AI devices 2210a to 2210e shown in FIG. 22 can be seen as specific embodiments of the AI device 2100 shown in FIG. 21.

<AI+Robot>

The robot 2210a may be implemented as a guide robot, a carrying robot, a cleaning robot, a wearable robot, an entertainment robot, a pet robot, an unmanned flying robot, etc., to which AI technology is applied. The robot 2210a may include a robot control module for controlling the operation, and the robot control module may refer to a software module and/or a chip implementing the software module. The robot 2210a may acquire the state information of the robot 2210a using the sensor information acquired from various kinds of sensors and/or detect (recognize) the surrounding environment and/or the object, and/or generate map data, and/or determine a travel route and/or a travel plan, and/or determine a response to user interaction, and/or determine an operation. The robot 2210a can use the sensor information acquired from at least one sensor among the LIDAR, the radar, and/or the camera to determine the travel route and/or the travel plan.

The robot 2210a can perform the above-described operations using a learning model composed of at least one ANN. For example, the robot 2210a can recognize the surrounding environment and/or the object using the learning model, and can determine the operation using the recognized surrounding information and/or the object information. The learning model may be learned directly from the robot 2210a and/or learned from an external device such as the AI server 2220. The robot 2210a can directly generate a result using the learning model and perform an operation. The robot 2210a may transmit sensor information to an external device such as the AI server 2220 and may receive the generated result and perform an operation.

The robot 2210a may determine the travel route and/or the travel plan using at least one of the map data, the object information detected from the sensor information and/or the object information acquired from the external device, and drive the robot 2210a according to the determined travel route and/or travel plan by controlling the driving unit. The map data may include object identification information on various objects arranged in a space in which the robot 2210a moves. For example, the map data may include object identification information on fixed objects such as walls and doors, and/or on movable objects such as pots and desks. The object identification information may include a name, a type, a distance, and/or a position, etc. The robot 2210a can perform the operation and/or run by controlling the driving unit based on the control/interaction of the user. The robot 2210a may acquire the intention information of the interaction due to the user's operation and/or voice utterance, determine the response based on the acquired intention information, and perform the operation.

The present disclosure can have various advantageous effects.

For example, the target MN and (target) SN can continuously allocate the PDU session to each RSN as requested by CN.

For example, redundant transmission for higher layer multi-connectivity can be performed efficiently after inter-MN handover with/without MN initiated SN change procedure.

For example, for failure about the dual connectivity, the SMF can efficiently decide whether to continue with the PDU session not admitted at the (target) SN or release the PDU session.

For example, target MN and SN can remap the RSN to different PDU session ID according to its resource status.

For example, the UE's experience can be enhanced since the reliability for the data transmission can be improved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method for a source Master Node (MN) of an inter-MN handover procedure in a wireless communication system, the method comprising:
    transmitting, to a source MN of the inter-MN handover procedure, a handover request message including information on a redundancy sequence number (RSN),
    wherein the information on the RSN includes a value of the RSN,
    wherein a first protocol data unit (PDU) Session spans from a User Equipment (UE) via the source MN to a first User Plane Function (UPF),
    wherein a second PDU session spans from the UE via an SN to a second UPF,
    wherein a Session Management Function (SMF) determines whether each the first PDU session and/or the second PDU session is to be handled redundantly, and
    wherein the SMF determines the value of the RSN which differentiates the first PDU session and/or the second PDU session that are handled redundantly; and
    receiving a handover request acknowledge message as a response to the handover request message from a target MN.

2. The method of claim 1, wherein the handover request message includes information related to remapping for the PDU session.

3. The method of claim 1, wherein the UE is currently connected to both the source MN and a source SN in dual connectivity.

4. A method performed by a User Equipment (UE) connected to a source Master Node (MN) of an inter-MN handover procedure in a wireless communication system, the method comprising:
    configuring a dual connectivity with the source MB and a source Secondary Node (SN);
    initiating a first protocol data unit (PDU) Session and a second PDU Session,
    wherein a first PDU Session spans from the UE via the source MN to a first User Plane Function (UPF),
    wherein a second PDU session spans from the UE via an SN to a second UPF,
    wherein a Session Management Function (SMF) determines whether each the first PDU session and/or the second PDU session is to be handled redundantly, and
    wherein the SMF determines the value of the RSN which differentiates the first PDU session and/or the second PDU session that are handled redundantly;
    receiving, from the source MN, a Radio Resource Control Reconfiguration message for a handover from the source MN to a target MN,
    wherein, for the handover, the source MN transmits, to a target MN, a handover request message including information on a redundancy sequence number (RSN),
    wherein the information on the RSN includes a value of the RSN, and
    wherein the source MN receives a handover request acknowledge message as a response to the handover request message from a target MN; and
    transmitting, to the target MN, an RRC Reconfiguration complete message for the handover.

5. A User Equipment (UE) connected to a source Master Node (MN) of an inter-MN handover procedure in a wireless communication system, the UE comprising:
    a memory;
    a transceiver; and
    a processor operably connected to the memory and the transceiver, wherein the processor is adapted to:
    configure a dual connectivity with the source MB and a source Secondary Node (SN);
    initiate a first protocol data unit (PDU) Session and a second PDU Session,
    wherein a first PDU Session spans from the UE via the source MN to a first User Plane Function (UPF),
    wherein a second PDU session spans from the UE via an SN to a second UPF,
    wherein a Session Management Function (SMF) determines whether each the first PDU session and/or the second PDU session is to be handled redundantly, and
    wherein the SMF determines the value of the RSN which differentiates the first PDU session and/or the second PDU session that are handled redundantly;
    receive, from the source MN, a Radio Resource Control Reconfiguration message for a handover from the source MN to a target MN,
    wherein, for the handover, the source MN transmits, to a target MN, a handover request message including information on a redundancy sequence number (RSN),
    wherein the information on the RSN includes a value of the RSN, and
    wherein the source MN receives a handover request acknowledge message as a response to the handover request message from a target MN; and
    transmit, to the target MN, an RRC Reconfiguration complete message for the handover.

* * * * *